(12) United States Patent
Zuber

(10) Patent No.: US 8,112,713 B2
(45) Date of Patent: Feb. 7, 2012

(54) METHOD FOR PROVIDING ALIAS FOLDERS IN A DOCUMENT MANAGEMENT SYSTEM

(76) Inventor: Thomas Zuber, Los Angeles, CA (US)

( * ) Notice: Subject to any disclaimer, the term of this patent is extended or adjusted under 35 U.S.C. 154(b) by 0 days.

(21) Appl. No.: 13/109,556

(22) Filed: May 17, 2011

(65) Prior Publication Data

US 2011/0213806 A1    Sep. 1, 2011

Related U.S. Application Data

(63) Continuation-in-part of application No. 12/575,442, filed on Oct. 7, 2009.

(60) Provisional application No. 61/516,241, filed on Mar. 31, 2011, provisional application No. 61/465,407, filed on Mar. 18, 2011.

(51) Int. Cl.
G06F 3/00 (2006.01)

(52) U.S. Cl. ......... 715/738; 715/733; 715/748; 715/751

(58) Field of Classification Search .................. 715/738, 715/733, 748, 751
See application file for complete search history.

(56) References Cited

U.S. PATENT DOCUMENTS

| | | | |
|---|---|---|---|
| 5,956,715 A * | 9/1999 | Glasser et al. ........................ | 1/1 |
| 7,467,212 B2 | 12/2008 | Adams | |
| 7,620,902 B2 | 11/2009 | Manion | |
| 7,634,735 B2 | 12/2009 | McCary | |
| 7,680,927 B2 | 3/2010 | McMullen | |
| 7,734,690 B2 | 6/2010 | Moromisato | |
| 7,783,698 B2 | 8/2010 | Jain | |
| 2004/0193672 A1 * | 9/2004 | Samji et al. .................. | 709/200 |
| 2005/0097440 A1 | 5/2005 | Lusk | |
| 2006/0010197 A1 | 1/2006 | Ovenden | |
| 2007/0124374 A1 * | 5/2007 | Arun et al. .................... | 709/204 |
| 2007/0150551 A1 * | 6/2007 | Krishnan et al. .............. | 709/218 |
| 2008/0133445 A1 | 6/2008 | Pennington | |
| 2008/0208963 A1 | 8/2008 | Eyal | |
| 2009/0070334 A1 | 3/2009 | Callahan | |
| 2009/0106822 A1 | 4/2009 | Obasanjo | |
| 2009/0216859 A1 | 8/2009 | Dolling | |
| 2009/0271247 A1 | 10/2009 | Karelin | |
| 2009/0307604 A1 | 12/2009 | Giles | |
| 2010/0115029 A1 | 5/2010 | Mahon | |
| 2010/0262629 A1 | 10/2010 | Adelman | |
| 2011/0010384 A1 | 1/2011 | Luo | |

* cited by examiner

Primary Examiner — Michael Roswell
(74) Attorney, Agent, or Firm — Benjamin C. Deming

(57) ABSTRACT

Interactive collaboration within a secure, server-based social community integrated with a secured document management system that includes at least one of a plurality of professional functionalities and a plurality of integrative functionalities to members having a member virtual identity within the community. Members of the community may create a personalized custom set of folders within the document management system, which customized arrangement allows the members to view documents, files, and folders as they desire. By creating these personalized custom "alias" folders, the members rearrange folders to be more accessible to themselves, while leaving the actual files and folders unchanged as viewed by every other member of the community. Members or a network administrator may also grant permission to other members of the network to access alias folders of each other member.

20 Claims, 25 Drawing Sheets

FIG. 4

LawLoop.com  Robert L, Thormas, Esq.  Logout  Help

Home | My profile | Contacts | Loops | Events  [   ] Search

1010 — My profile
1011 — Loops

Welcome. Jonathan
Today is Thursday February 12. 2009

Request for Responses
2 contact requests
4 loop invitations

One-Click Communication
- Message
- E-Mail
- Voice Call
- Video Call

Find a Lawyer

Post a Job

Notifications
12 notifications

Document Management Rooms  1030
- E-Mails
- Word Processor
- Spreadsheets  1040
- Presentations  1050
- Images  1060

Advertise on LawLoop

AD

Calendar - Day View  1020
Thursday. February 12

- Calendar
- Loop Activity

▾Appointments (7)
Edit Select All MonthView

11:00am
Event
Networking brunch
2:30pm
Video Call
...

☐ Michael Lewis, Esq. Made partner at...

☐ Jonathan E. Smith, Esq. Received a new Comment from Matt Lendach, Technical...

"Jonathan, I loved your seminar last week. My head is swirling from the possibilities but now I see how Patent Protection can be"...

Matt attended Jonathan's seminar Patent Basics for Beginners

AD

From our partner life for Federal Law Updates
Trademark Law Judicial Opinion Summary
AZ Court Grants Injunctive Relief to Garduno in Restaurant Trademark Suit Versus Tortilla, Inc.
January 27 2009
More updates >>
LawUpdates.com for Legal Industry News
Aide's Tax Problems Caused by LFS: "Late-Filing Syndrome"
January 27 2009
More news >>

Upcoming Events (5)  See All
Tomorrow, 11:00am Patent Law Seminar
Saturday, 3:00pm
...

▾To-Do (14)  Edit|See All
Call Client X about matter Y  [Add]  X
...

▾Birthdays  See All
Today
Robert I. Thomas, Esq.
Tomorrow
Jameson P. Menwether, Esq.

☐ Stacey Conrad, Esq. joined Lawfirm XYZ as an Associate 5:42pm

☐ Zuber & Taillieu LLP added Counsel MichelleNichole, Esq. and Paralegal Stephen Berg 5:32pm ☐ At the Office by Jonathan E. Smith, Esq. 4 New Photos 5:52pm ☐ Rachel Warren, Esq. has joined the loop Beverly Hills IP ☐ Jonathan E. Smith, Esq. has posted a new photo to the album At the Office "This is after our defeat of the plaintiff after only 3 hours"

☐ Irving Lansbury, Esq. Has connected with Marcel Jacob Levers him, Esq 2:14pm

LawLoop.com                                    Robert L, Thormas  Logout  Help
         Home |My profile| Contacts Loops  Events        [      ] [Search]

Mark Roberts
Law Student
Harvard University - School of Law, J.D.,
Class of 2010
Boston, MA

Languages
    English, French                              [ Submit ]
1015
Profile Content
Articles (2)|Resources (5)|Blog|Contact Info ⊞ Loop Activity

⊟ Blog

⊟ Seminars (5)

⊟ Contact Info
    School
    Harvard University        Email mroberts@
    School of Law                      harvard.edu
                    Company (310) 485-9421
    Home Address   Home (323) 518-2592
                    Mobile (323) 328-2021

⊟ Biography
    Mark Roberts is studying...Lorem ipsum dolor sit amet,
    consectetuer adipiscing elit,
    .... Read full biography ⊞ Education
    Harvard University School of Law
    J.D., Class of 2003
    Major / s     Public Policy
    Honors        Outstanding Scholar
    Societies     Society 1, Society 2, Society 3
    Activities    Activity 1, Activity 2, Activity 3

▷ View Video Introduction
Add Mark as a Contact
Invited Mark to a Loop
Send an E-mail to Mark
Voice Call Mark

Contacts (156)
                View All
    ◁ 1 of 52 ▷
    Irying Lansbury
    Ion Law
    XYZ Corporation

Articles (2)
    ◁ 1 of 3 ▷
Quanta Computer v, LG
Jul 27, 2008

Resources (5)
            add i
    ◁ 1 of 2 ▷
Abajournal.com
Sep 30, 2008
Federal Circuit Abandons "Point of Novelty" Test in Egyptian Find a Lawyer
Post a Job
Advertise on LawLoop

AD

AD

LawUpdates.com
Trademark Law
Judicial Opinion
Summary
AZ Court Grants
Injunctive Relief
to Garduno ....

More updates >>

LawUpdates.com
for Legal Industry
News

More news...

LawLoop.com　　　　　　　　　　　　Robert L, Thormas　Logout　Help
　　　Home　My profile　Contacts│Loops│ Events　　　[　　] [Search]

My Loops　Browse Loops　Create a New Loop　Loop │ Administer

| Zuber & Taillieu LLP<br>○ ○ ○ | Zuber & Taillieu LLP<br>🔒 SECURE ORGANIZATION LOOP<br>　View Subloops (128)<br>This Loop is for current employees of Zuber &<br>Taillieu LLP. The content in this area is<br>CONFIDENTIAL, please do not distribute beyond<br>authorized recipients. dolor sit amet,...<br>Website: www.zuberlaw.com | Find a<br>Lawyer<br><br>Post a Job<br><br>Advertise on<br>LawLoop<br><br>AD |

⊙ Document
　Management
　Room

Join this Loop ──1018
Recommend other
Lawyers

Loop information
Custom Loop
This Loop is
created...

**Restricted
Membership**
All Members of this
Loop must be
approved by the
Loop Administrator.

Open to Non-Lawyers

Both Lawyers and
Non-Lawyers
may be Members
of this Loop.

Secure Loop
This Loop is a ...

Loop Administrators
　Olivier A. Taillieu
　Lawyer
　Zuber & Taillieu
Loop Members ()
　　View all
　Rachel warren
　Lawyer
　Zuber & Taillieu LLP Sharred Contacts All Contact Files (435)
　　　　　　　1160
Profiles Only (223)
　　　　　　　1150
Lawyers Profiles Only ()

Loop Content
Calendar│Loop Activity│Announcements│Members ()
Shared Contacts Calendar
─────────────────────────────
Loop Activity　　　　　　　◀1of 65▶
Today
─────────────────────────────
☐ John Robertson and Bruce H. Beckford have
　joined this loop. 4:52 pm
☐ Jonathan E. Smith has posted the article
　Patent Basics: Part 1 of 5, how to patent
　your work. 4:27pm
☐ New Comment from Robert L. Thomas 12:02 am
　[ Lorem ipsum dolor sit amet, consectetur ... ]
☐ Thomas L. Hanford has shared a contact:
　Jayden McDougal
　[ I believe Jayden could be of ... ]

Yesterday
☐ John Robertson, Cathy C. Cacvallo, Matthew
　P. Smith, and 12 others have joined this loop.
☐ New Related Event: Conference with Client
　Friday December 3 at 3:00 pm 6:49pm
☐ Thomas L. Hanford has posted the seminar
　Securities Law Basics ⊟ Administrator Announcements
　　　　　　　　　　☐ Subscribe to RSS Feed
Posted by Olivier A. Taillieu　　　◀1of 15▶
March 30,2009 8:52 pm
Lorem ipsum dolor sit amet, consectetuer adipiscing
elit. Phasellus odio ml, suscipit nec, bibendum sed,
suscipit in, nisi. Maecenas aliquet sem et
Read full entry
Please read this New Judicial Opinion
Posted by Olivier A. Taillieu

AD

LawUpdates.com
Trademark Law
Judicial Opinion
Summary
AZ Court Grants
Injunctive Relief
to Garduno ....

More updates >>

LawUpdates.com
for Legal Industry
News

More news...

METHOD FOR PROVIDING ALIAS FOLDERS IN A DOCUMENT MANAGEMENT SYSTEM

CROSS REFERENCE TO RELATED APPLICATIONS

This application is a continuation-in-part of U.S. patent application Ser. No. 12/575,442, filed on Oct. 7, 2009, the contents of which are hereby incorporated in the entirety. This application also claims priority to U.S. Provisional Patent Application No. 61/516,241 filed on Mar. 31, 2011. This application is also related to commonly owned U.S. patent application Ser. No. 12/885,235, filed on Sep. 17, 2010, U.S. patent application Ser. No. 13/011,655, filed on Jan. 21, 2011, U.S. patent application Ser. No. 13/023,461, filed on Feb. 8, 2011, and U.S. Provisional Patent Application No. 61/465,407, filed on Mar. 18, 2011. The contents of each of these patent applications are hereby incorporated in their entirety.

STATEMENT REGARDING FEDERALLY-SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to systems and methods for interactive collaboration within a secure, online social networking community integrated with a document management system and made up of virtual identities enabled with multiple social networking functionalities, document management functionalities, and integrative functionalities.

Social networking web sites, such as Facebook.com and MySpace.com, are communities of persons having virtual identities enabled with social networking functionalities. Such sites are often geared towards users having special recreational or social interests such as baseball games, motorcycle riding or dating. There are also social networking web sites for professionals—for example, LinkedIn.com, EsqChat.com and LegallyMinded.com—and some of these sites are communities of persons having virtual identities enabled with social networking functionalities. However, such social networking web sites do not include integration with a secured document management system, which integration provides synergies that facilitate viral online growth, as well as the foundation for the conception and creation of integration functionalities that facilitate business networking, operations and transactions.

The prior art also discloses document management systems, meaning systems for managing, creating, editing, deleting, saving, organizing and accessing documents. For instance, Microsoft Office®, more particularly, its Word®, Excel®, and Power Point® applications, allow for creating, editing, deleting, saving and accessing of documents. Microsoft Office® also includes an Outlook® application that allows creating, editing, deleting, saving, accessing, sending and receiving emails. Another prior art system, Interwoven, Inc., offers a document management system that allows for organizing, storing and retrieving documents.

The preceding document management systems are generally examples of stand-alone document systems, most of which are only available as stand-alone systems that require a dedicated network and are not available online. Thus many systems offering document management systems are not available with the type of economies of scale obtainable when offered to a larger community online. Some systems provide some functionalities of a document management system in an online context. For instance, Google.com and OpenOffice.org offer applications for creating, editing, deleting, saving and accessing documents in an online context, and for creating, editing, deleting, saving, accessing, sending and receiving emails in an online context. For instance, HyperOffice.com offers an online document organization system for organizing, storing and retrieving documents online. However, such document management systems that operate in an online context are not offered in the context of integration with a networking community made up of virtual identities enabling social networking functionalities, enhanced with the integrative functionalities described below. Thus, the prior art lacks a means to allow a user to enable a single online virtual identity, via entry of a single username and password, that allows the user to manage documents in multiple secure online document management databases, where each document management database is shared by a different organization (or other group of users), and where each organization desires to keep documents confidential to the organization secure from and inaccessible by the other organizations as a wholes. Thus, the prior art also lacks a means of allowing the user the ability to easily move a document from one such secure online document management database to another.

Prior art document management systems operate by providing a folder system. In many cases, the document management system makes files available to one or more members of an organization. For example, a corporation might provide a document management system using Windows Explorer or a similar folder-based system, hosted on the corporation's servers. In other cases, a corporation may use a centralized, server-based document management system such as Interwoven Filesite, which typically organizes files according to client, matter, or similar groupings. The document management system may be hosted remotely, as in a cloud-based system. In each of these prior art systems, the documents are kept in an ordered set of files so that all members have access to the same set of document, filed according to the same system or convention. However, there are advantages to letting the users customize the filing system to the user's own preferences. Current document management systems lack an efficient method for allowing customization of the folders without adding unnecessary multiplication of folders, which causes clutter to the system and confusion to other users.

Contact file management systems disclosed in the prior art, such as Outlook®, allow the management of contact files, each of which contain contact information that may be imported into document management systems and word processing applications like Word®. However, in regard to a particular person, contact file management systems like Outlook® require each of tens or hundreds or even thousands of contacts of the particular person to create, maintain and/or update a contact file corresponding to the person. Software applications like Plaxo® facilitate the process of allowing each of many contacts of a single person to more easily update contact information of the single person. However, Outlook® and Plaxo® each (and collectively) have it backwards, so to speak, in that they require many contacts of a single person to collectively create, maintain, and/or update many contact files each corresponding to the single person. Thus, there is need for an invention that allows the single person to maintain a single contact file, which single contact file could be accessed by all of the contacts of the single person, the contact information of which single contact file is importable into document management systems and word processing applications of each of the contacts.

Thus there remains a need for a document management system integrated into a truly cooperative community of virtual identities that enable a plurality of social networking functionalities. There furthermore remains a need for a method for allowing users to create customized folders within the document management system without also affecting the organization of documents and folders as viewed by other users of the system. Finally, there remains a need for the integrative functionalities the creation of which is conceivable and made possible in the context of such integration, which integrative functionalities will facilitate business networking, operations and transactions, and allow cloud computing portals for document management systems to more fully tap the viral power of the internet as enabled by social networking functionalities.

BRIEF SUMMARY OF THE INVENTION

The future of web-based computing is rapidly taking shape. Emerging trends include such concepts as cloud computing and Web 2.0, in which a web or cloud-based infrastructure designed for rapid delivery of computing resources is made available through either a public or private provider. While many definitions of these concepts exist, the next generation of computing architecture will focus on delivering business and consumer services with a user focus, designed to encourage rapid innovation and efficient, collaborative decision making. Many market participants are actively trying to develop a dominant online portal for cloud computing, although none has yet done so.

The present invention describes an integration of cloud computing-based services through a portal that combines social networking functionalities with document management system functionalities, further enhanced with integrative functionalities as described herein.

The present invention discloses a secure, network-based collaborative work environment in which one or members of an online community having virtual identities enabled with social networking functionalities and document management functionalities are able to access and utilize a variety of integrative functionalities as fully described herein. The integrative functionalities include, but are not limited to:

clicking on an icon on a virtual identity existing in the context of a social networking website and thereby giving the person associated with such virtual identity access to (or retracting access of the person associated with such virtual identity to) a document management room shared by a network that at least some persons associated with virtual identities do not have access to;

clicking and dragging a document stored in a first folder containing documents shared by members of a first network of members (and not shared with members not of said first network) to a second folder containing documents shared by members of a second network (and not shared with members not of said second network), such that the document is shared with members of the first network and members of the second network, wherein at least one of said members of said second network is not also a member of said first network;

in regard to a particular set of folders, creating one or more personalized custom folders viewable by the member who created the personalized custom folders, which personalized custom folders do not interfere with or otherwise affect the actual organization of the set of folders as viewed by other members of the network, such that each member may create his or her own set of personalized custom folders, and such that the each set of personalized custom folders exists independently from each other set of personalized custom folders, and such that only those members who have been given access to a particular set of personalized custom folders are able to view said personalized custom folders;

clicking and dragging a document stored in a first folder containing documents shared by members of a first network of members (and not shared with members not of said first network) to a second folder containing documents shared by members of a second network (and not shared with members not of said second network), such that the document is shared with members of the first network and members of the second network, and such that the document appears on the second network virtual identity page (e.g.: the Secure Loop Profile page), wherein at least one of said members of said second network is not also a member of said first network;

having software applications that import contact information from member virtual identities, thereby allowing to auto-fill of contact information in the context of document drafting, mail merge applications in the context of mass distributions, etc. (e.g.: thereby effectively eliminating the need to obtain a new business acquaintance's business card, create a new contact file (i.e.: in a contact file management program like Outlook®) containing the new business acquaintance's contact information, or ever update such contact file—just add the business acquaintance's member virtual identity, which will contain contact information updated by the business acquaintance himself/herself); and furthermore allowing members of a network of members to share a pool of virtual identity contacts, such that members not of the at least one network of members do not have access to the pool of virtual identity contacts; and other features and advantages of the present invention will become more apparent from the following description of the embodiments, taken together with the accompanying several views of the drawings, which illustrate, by way of example, the principles of the invention.

BRIEF DESCRIPTION OF THE SEVERAL VIEWS OF THE DRAWING

FIG. 4 is an exemplary implementation of another aspect of the present invention showing information on a member's virtual identity and implementation of integrative functionalities therein;

FIG. 5 is an exemplary graphical implementation of another aspect of the present invention showing a home page;

FIG. 8 is an exemplary graphical implementation of another aspect of the present invention showing a member profile of a second members as viewed by an owner;

FIG. 10 is an exemplary graphical implementation of another aspect of the present invention showing lists of contacts;

FIG. 12 is an exemplary graphical implementation of another aspect of the present invention showing a network profile;

FIG. 13 is an exemplary graphical implementation of another aspect of the present invention showing a document management tool with a document filing tool and email tool active;

FIG. 14 is an exemplary graphical implementation of another aspect of the present invention showing a document management tool with a document filing tool and word processor tool active;

FIG. 17 is an exemplary graphical implementation of another aspect of the present invention showing a document management tool with a document filing tool and image viewing tool active;

FIG. 19 is an exemplary graphical implementation of another aspect of the present invention showing lists of shared contacts.

FIG. 20 is an exemplary graphical implementation of another aspect of the present invention showing the standard or default view of folders and files.

DETAILED DESCRIPTION OF THE INVENTION

Figure 1:
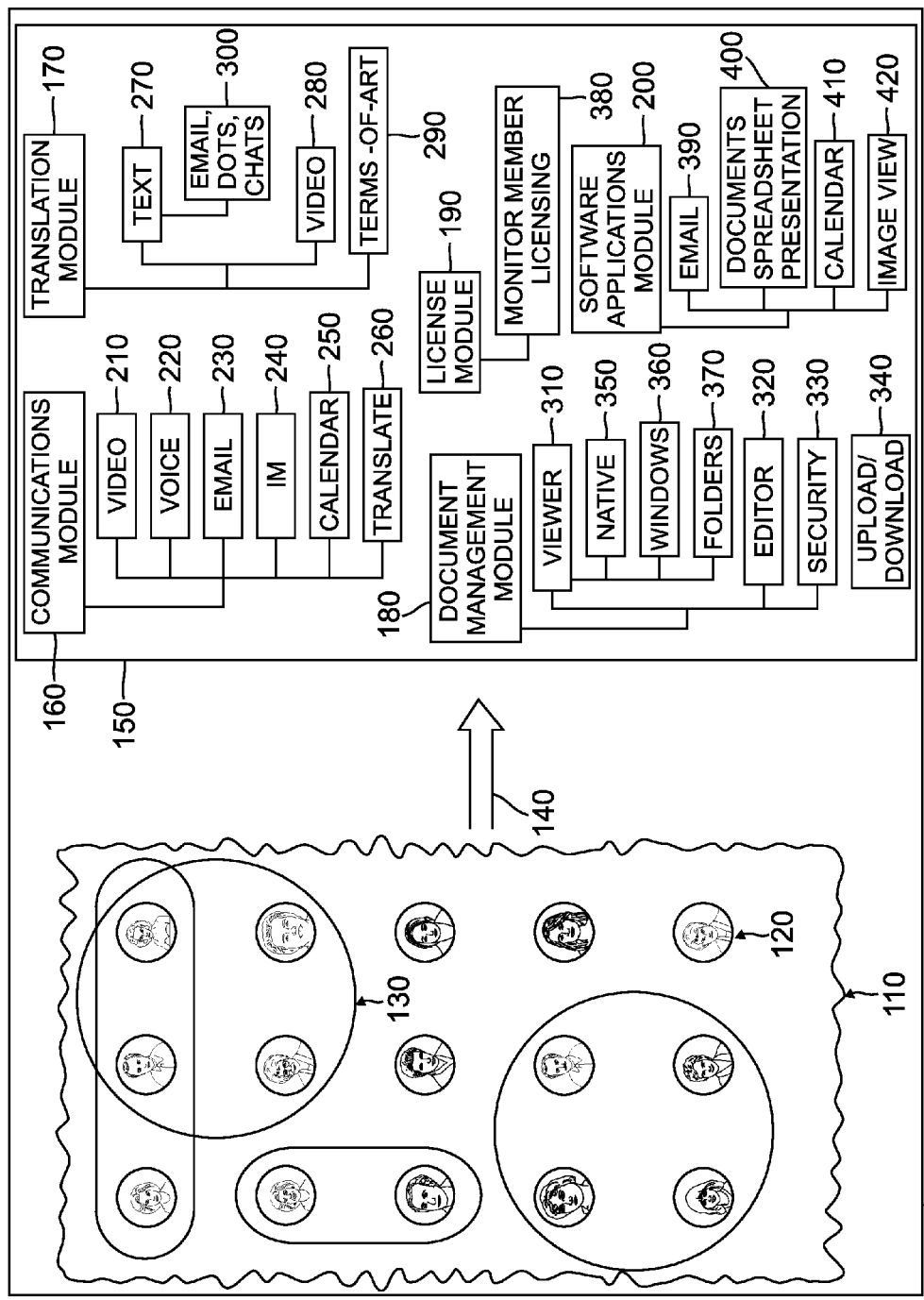
FIG. 1 is a conceptual diagram of a system and method of providing an online social community with integrative functionalities according to one embodiment of the present invention.

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention. Without limiting the generality of the foregoing, some of the descriptions and examples below relate to law firms, and to attorneys, staff persons and clients of law firms, as a matter of convenience, and for the sake of illustration, only; and the present invention may be utilized and practice by other organizations, professionals, entities and/or persons, and such use and practice is contemplated by and included within the scope of the present invention.

Detailed Description of the Invention and Embodiments as Claimed

The present invention discloses a method for providing the secure, network-based collaborative work environment within the context of an online community. The present invention further discloses a method for displaying the contents of a document management system folder or folders so that the contents are displayed in a set of "alias" folders customized to the needs of the member who created the folders, as described below. The present invention further discloses integrative functionalities which lie on top of, and are made possible by, combining social networking functionalities and document management functionalities, within a remote, secure online environment.

Social Networking Functionalities

Members of the online community have an account with the online community which defines a member virtual identity associated with the member. The member virtual identity typically includes web pages that convey information about the member to one or more other members of the community, is enabled with one or more social networking functionalities, and is an online representation of that member that may take many different forms. In regard to each member, participation in the online community typically requires identification verification in order to enable the member's member virtual identity, and therefore means of identifying a member, such as a username, a password, fingerprints, or some other form of identification means relating an identity of a member to his or her member virtual identity, may also be included within the member virtual identity so that a member entering such information can be verified as the owner of the member virtual identity. The member virtual identity allows members to participate in at least one social functionality available within the online community. Alternatively, the member virtual identity may be represented by an icon ("icon" meaning a graphical link, textual link, or other link to a web page or a location on a web page) instead of web pages. Typically, though, a member virtual identity will consist simply of a login account of the relevant member, a web page or a collection of web pages associated with the member (which typically include/s a profile (defined below) of the member and may or may not include additional web pages), and at least one social networking functionality (defined below).

For example, a first member may access his/her member virtual identity by typing in a username and password at a login web page, as a user of social networking websites such as Facebook.com, Myspace.com or LinkedIn.com enters a username and password at a login web page to access his/her member virtual identity. Upon doing so, the web pages of the member's virtual identity appear, starting with a home page such as the web page depicted at FIG. 5 (also referred to herein as "Home Page") to appear. The member may access his/her profile (profile of a member or "member profile" meaning the web pages of a member's member virtual identity that are partially or wholly visible to one or more other members of the community, often including contact information of the member, such as but not limited to business address, home address, business phone number, home phone number, mobile phone number, business fax number, home fax number, email address, etc., as the term "profile" is commonly understood in the online social networking industry) by clicking on the "My Profile" link at 1010, causing a web page of the profile such as the web page depicted at FIG. 6 (also referred to herein as "Profile—View By Owner," where "owner" means the first member referenced above to whom the member virtual identity corresponds) to appear. Profile—View By Owner can differ from the versions of the Profile that are visible to one or more other members (i.e.: other than the Owner). For example, members other than the owner who have not been added as contacts ("contact" having a meaning analogous to "friend" on Facebook.com or Myspace.com, or to "connection" on LinkedIn.com, as the term "contact" is commonly understood in the online social networking industry) may see the version of the profile depicted at FIG. 7 (also referred to herein as "Profile—View by Members Who Are Not Contacts"), which might differ from Profile—View By Owner, for example, in that Profile—View By Owner can include links that allow the owner to add, delete or edit content on his/her profile, and the web page depicted in FIG. 9 (also referred to herein as "Profile—View by Members Who Are Contacts" might not; and in that Profile—View by Members Who Are Contacts may include an "Add Jonathan as a Contact" link, while the Profile—View By Owner might not.

Figure 7:
FIG. 7 is an exemplary graphical implementation of another aspect of the present invention showing a member profile as viewed by members who are not contacts.

The member, being a first member, may add a second member as a contact, whereby the second member would be a contact of the first contact (and vice versa), such that, for example, the first member could view additional and/or alternative web pages and/or information (e.g.: which additional and/or alternative web pages and/or information are created and selected by the second member in accordance with methods disclosed and enabled in the prior art, which disclosures are incorporated herein by reference) of/on the second member's profile (and vice versa, respectively), for example, by clicking on the "Add Mark as a Contact" link 1015 on the profile of the second member depicted at FIG. 8 (also referred to herein as "Member Profile of Second Member—Viewed By Owner"), and thereby delivering a message (e.g.: via email, electronic message, instant message, or another social networking functionality of the community) to the second member allowing the second member to "accept" the request (i.e.: to effect the add and thereby make the requestor a member of the network), for example, by clicking on a link within the message. Having been added as a contact by the first member, the second member could see the version of the profile depicted at FIG. 9 (Profile—View by Members Who Are Contacts), which may differ from Profile—View By Members Who Are Not Contacts in FIG. 7, for example, in that Profile—View by Members Who Are Contacts in FIG. 9 can include additional contact information 1016 that is not included in the Profile—View by Members Who Are Not Contacts as shown in FIG. 7.

Figure 6:
FIG. 6 is an exemplary graphical implementation of another aspect of the present invention showing a member profile.
Figure 10:
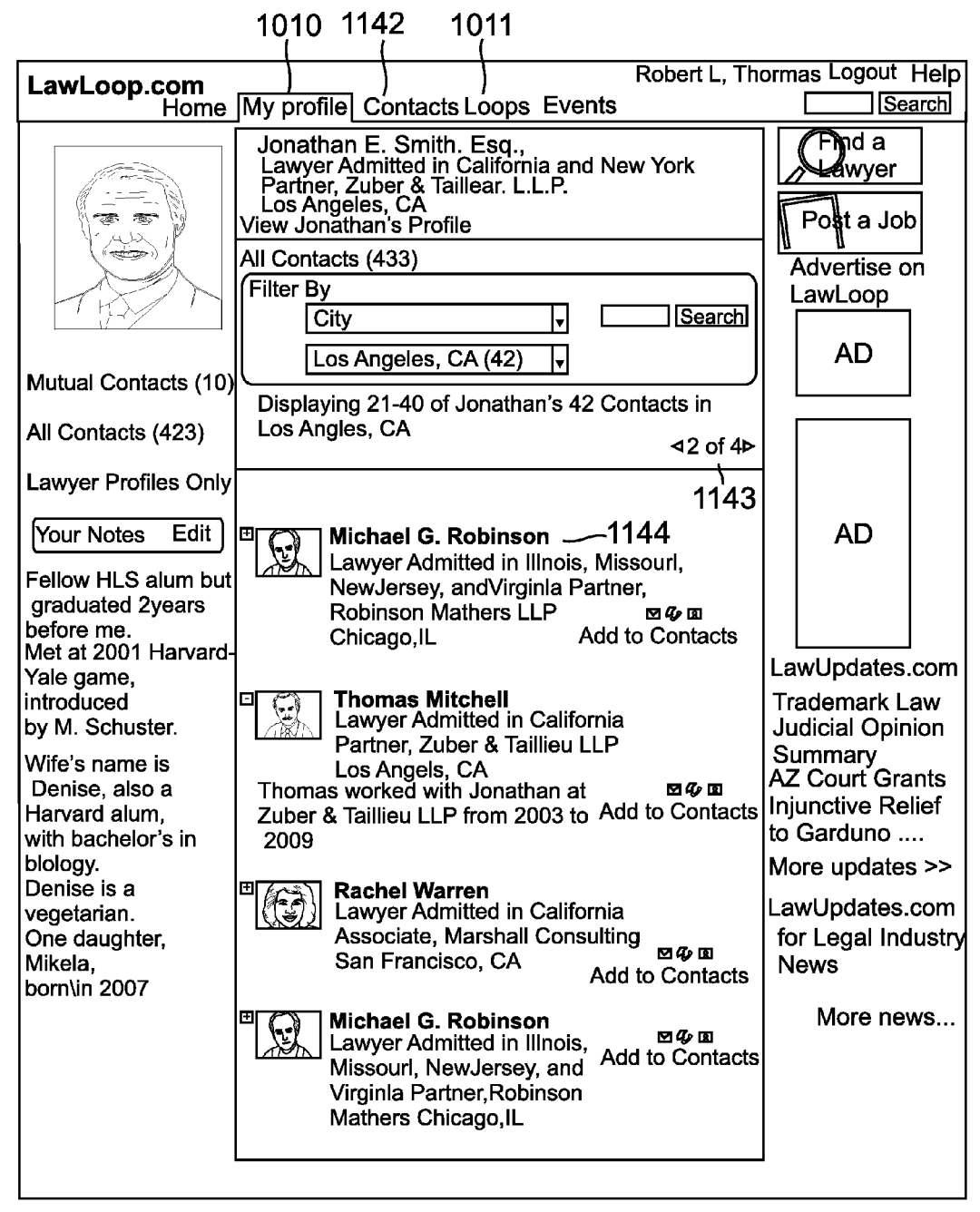

Furthermore, the first member, having logged in via the login account of his/her own virtual identity and accessed his/her own profile, could click on an icon 1142 of his own profile depicted in FIG. 6, thereby causing a web page depicted at FIG. 10 (also referred to herein as "Lists of Contacts") displaying a list of links to the profiles of all contacts of the second member to appear, which links could be listed in alphabetical order based on the last name (or first name) of the contacts corresponding to the links, or based on many other ranking criteria. In an alternative embodiment, if links to all of the contacts do not appear on one web page (for example, if the links are for any reason too numerous to appear on one web page), the member may browse additional lists of contacts by clicking the icon 1143 on FIG. 10, causing in the instance of each such click a web page displaying a list of links to profiles of additional contacts to appear, with each subsequent list a continuation of the immediately preceding list. Of course, referencing the example of the previous paragraph, a link to the profile of the second member. would appear on this list or one of these lists, respectively. The first member can click on a link 1144 on FIG. 10, which link links to the profile of the contact corresponding to the link, thereby causing the profile to appear.

The member virtual identity may also (but does not necessarily) allow a member to include professional and/or personal expression within the online community. For example, a member's thoughts on a particular subject, a member's planned activities, or any other expressive or emotive action, may be conveyed via the member virtual identity. The professional and/or personal expression conveyed via the member virtual identity may be conveyed in the context of a social networking functionality or through any other means available in the online community.

Examples of member virtual identities are widespread in the prior art. For example, online representations consisting of a user's login account, and the user's associated web page/s, on social networking websites such as Facebook.com, Myspace.com and LinkedIn.com, are each member virtual identities for the purposes of the present invention.

The members of the online community are capable of assembling into networks and sub-networks. These networks allow members to come together interact with each other via the social networking functionalities. An important feature of the present invention is that networks may be exclusive to certain members but not others, so that networks exclude at least one member in the online community. This allows for a collaborative work environment that provides members with the ability to work together on projects, and to communicate with one another, in situations where some members of the online community cannot or should not participate. For example, lawyers who are members and included with a network or sub-network in which they are working on a set of documents for a client or clients must know that they are not sharing confidential information with members who cannot have access to that confidential information. Therefore, this network or sub-network will exclude other members to protect the confidential nature of the collaboration among members of that network.

A network within the online community may also have a network virtual identity associated with the network. The network virtual identity typically includes web pages that convey information about the network to one or more members of the community, may or may not be enabled with one or more social networking functionalities, and is an online representation of that network that may take many different forms. Alternatively, the member virtual identity may be represented by an icon instead of web pages. Typically, though, a network virtual identity will consist simply of a web page or collection of web pages associated with the network (which typically include/s a profile of the network and may or may not include additional web pages), and a link to a member virtual profile of at least one member who is a member of the network.

The network virtual identity may also include on its web pages professional and/or personal expression of one or more members of the network, which may be visible only to members of the network, or may be visible to members of the online community as a whole. For example, a network member's thoughts on a particular subject, a member's planned activities, or any other expressive or emotive action, may be conveyed via the network virtual identity. The professional and/or personal expression of members of the network conveyed via the network virtual identity may be conveyed in the context of a social networking functionality or through any other means available in the online community.

Figure 11:
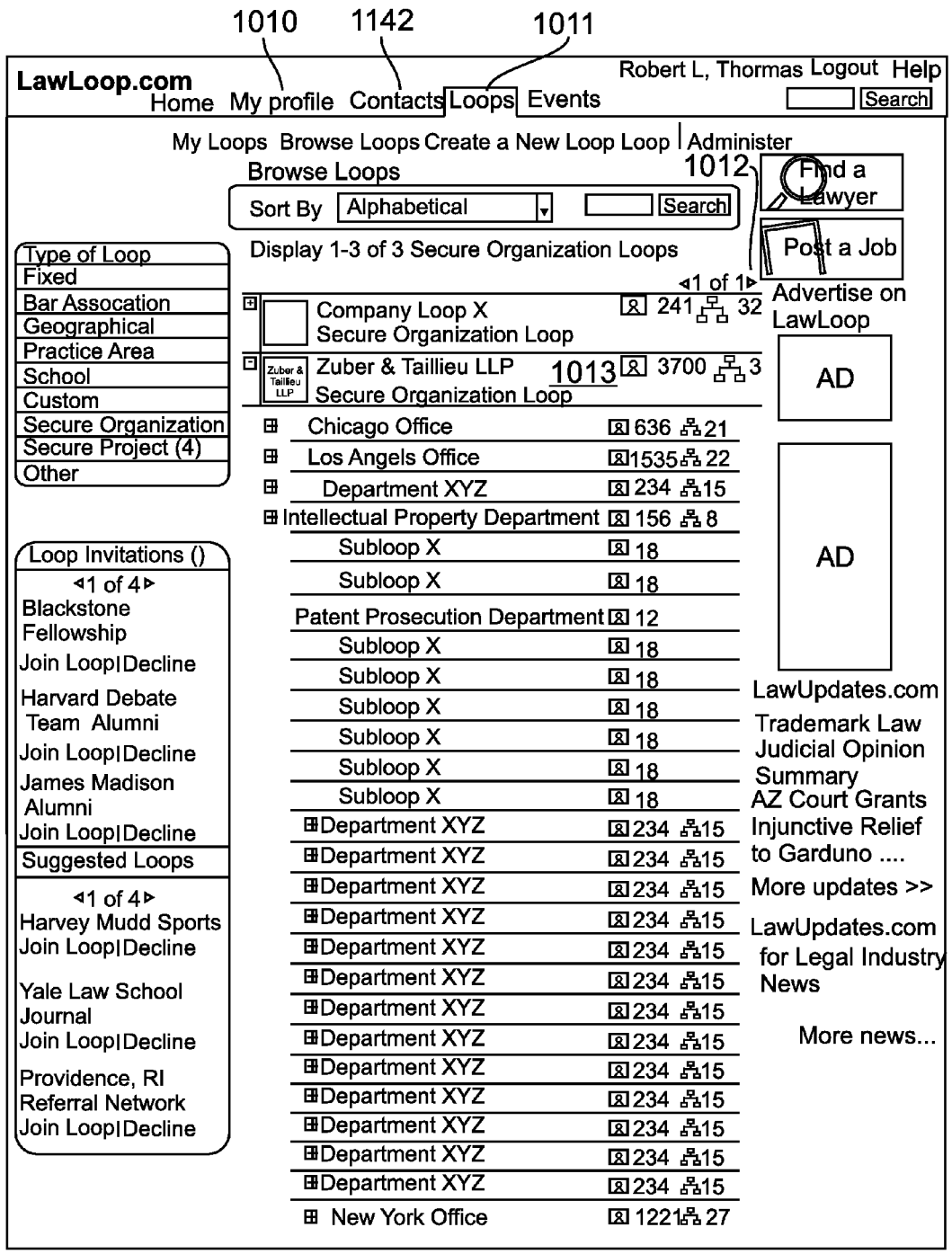
FIG. 11 is an exemplary graphical implementation of another aspect of the present invention showing lists of links to network profiles.

A member may browse network profiles ("profile" of a network or "network profile" meaning the web pages of a network's network virtual identity that are partially or wholly visible to one or more members network, or of the community as a whole, as the term "profile" is commonly understood in the online social networking industry) by clicking on the "Loops" link at 1011, causing a web page displaying a list of links to network profiles such as the web page depicted at FIG. 11 (also referred to herein as "List of Network Profiles") to appear. The member may browse additional lists of network profiles by clicking the forward arrow at 1012, causing in the instance of each such click a web page displaying a list of links to additional network profiles to appear. The member may click on the network profile link at 1013 ("Link to Network Profile"), causing the network profile depicted at FIG. 12 (also referred to herein as "Network Profile") to appear.

Typically, members of the network have rights to access and/or alter the network virtual identity that are greater than the rights of non-members, but not as great as the rights of a network administrator (i.e.: "network administrator" meaning any person or entity that may add and/or remove a member (i.e.: other than himself/herself/itself) from a network, as described below) of the network. For example, non-members of the network might be able to view a profile page of the network, but not be able to access other web pages of the network virtual identity, or to post professional and/or personal expression on the web pages the network virtual identity, or to add or delete members to or from, respectively, the network; members of the network might be able to access other web pages of the network virtual identity in addition to the profile page, and to post professional and/or personal expression on the web pages the network virtual identity, but not be able to add or delete members to or from, respectively, the network; while the network administrator of the network might be able to access all web pages of the network, to post professional and/or personal expression on the web pages of the network virtual identity, and to add or delete members to or from, respectively, the network. Of course, many other combinations of non-member, member, and network administrator rights are contemplated and within the scope of the present invention.

Members may assemble into a network based on a variety of characteristics and via a variety of methods. For example, a network administrator of a network may create and maintain a network, and may "add" members to the network (i.e.: incorporate members into the network), for example, referencing the example above, by clicking the "Invite Jonathan to a Loop" icon 1017 on the member virtual identity at FIG. 7. As another example, a network administrator of a network may invite a member to be added to the network, again referencing the example above, by clicking the "Invite Jonathan to a Loop" icon 1017 on the member virtual identity at FIG. 7, thereby delivering a message (e.g.: via email, electronic message, instant message, or another social networking functionality of the community) to the corresponding member allowing the member to "accept" the invitation (i.e.: to effect the add and thereby become a member of the network), for example, by clicking on a link within the message. As another example, a non-member of a network may request to join the network by clicking on an icon 1018 on the network virtual identity of the network at FIG. 12, thereby delivering a message (e.g.: via email, electronic message, instant message, or another social networking functionality of the community) to the network administrator of the network allowing the network administrator to "accept" the request (i.e.: to effect the add and thereby make the requestor a member of the network), for example, by clicking on a link within the message.

In each of the foregoing examples, verification of the identification of the member associated with the relevant member network identity may be confirmed prior to addition of the member to the network via delivery of a password (e.g.: via email, electronic message, instant message, or another social networking functionality of the community) by the member to the network administrator of the network, which password might be conveyed through means outside of the social networking community (e.g.: in person, via telephone, or via postal mail). The present invention also contemplates a reciprocal such exchange of passwords between the member and the network administrator to confirm (from the member's perspective) the identity of the network owning the network virtual identity that the member would be added to and to confirm (from the network administrator's perspective) the identity of the member owning the member virtual identity.

Exclusion from a network may be achieved in a variety of different ways. For example, exclusion from a network may be achieved by a network administrator's refusal to add a member to a network, refusal to accept a member's request to be added to the network, or "removal" of a member (i.e.: a revoking of a member's membership in the network) previously added to the network. Any other means of including or excluding members from participating in a network or sub-network are also contemplated by and included within the scope of the present invention. Of course, a member may also effect non-membership in the network by refusing to request addition to the network, refusing to accept an invitation to join the network by a network administrator of the network, or by removing himself/herself from the network.

Other social networking functionalities are also available to members in the online collaborative work environment. The social networking functionalities are available to members remotely (for instance, social networking functions enabled by software saved to servers remote from the members that allow members to manage virtual profiles and other web pages and aspects of the collaborative work environment saved on servers remote from the members). Examples of social networking functionalities include real-time communication functions that allow members (including, in particular, professionals who require communication functions in the course of collaborating within the present invention) to quickly and efficiently communicate with each other. These communication functions include, but are not limited to, on-line video conferencing, on-line voice conferencing, emailing, on-line messaging, instant messaging, text messaging, calendaring, and message posting. All of these occur in the context of the collaborative work environment and may occur within one or more networks, particularly where confidential information is being discussed and where one or members are excluded from the network.

Social networking functionalities may be accessed via a single click of an icon. Icons representative of social network functionalities may be found on a member virtual identity, on a network virtual identity, or both. A member may select a social networking functionality from his or her member virtual identity by clicking on an icon. For instance, a member may click on the icon 1019 on the member profile at FIG. 7 to initiate an email to Jonathan (which email could appear in a pop-up window, enabled by the Email Tool described below, in accordance with disclosures in the prior art, which disclosures are incorporated herein by reference). Note that the icon 1019 may appear in different forms on the same page, as shown in FIG. 7. Similarly, a member may select a social networking functionality from a network virtual identity of a network to which he or she is a member. Because member and network virtual identities have visual representations via a graphical user interface, members can navigate toward iconic representations of the social networking functionalities. Members may also access the social networking functionality via other methods, such as for example, via pull-down menus. Of course, other methods of accessing social networking functionalities are contemplated and within the scope of the present invention.

Specific examples of the use of social networking functionalities within the networks and sub-networks of members include the use of calendaring and message posting systems. Social networking functionalities may be shared among members within one network, but not shared among members of a sub-network, so that activities within a sub-network are not activities within the broader network. For example, one social networking functionality is a calendaring system. The present invention contemplates that one calendaring system (or, set of occurrences) may be used within a network. Within a sub-network of that network, a second calendaring system (or set of occurrences) may be used in which entirely different events are used. Calendar events may include dates, notices, deadlines, appointments, meetings, or any scheduled occurrence. Therefore, an event in the sub-network may not be included in the main network, so that the two calendaring systems include different dates and events. Members of a network may therefore "break off" to assemble in a sub-network and calendar different events that do not have utility in the main network. It is important to note that the sub-network may exclude a member of the network of members and that calendared dates in the sub-network may not be accessible to those excluded therefrom.

Similarly, a message posting system is a social networking functionality in which messages posted in one network (or sub-network) are not included in a first (or main) network. Members of a network may "break off" to assemble in a sub-network and post different messages that do not have utility in the main network and may not be viewable or accessible in the main network. It is important to note, as above, that the sub-network may exclude a member of the network of members and that posted messages in the sub-network may not be accessible to those excluded therefrom. Message may include any method of conveying a message, and may occur on any type of forum or medium.

Further social networking functionalities are also subject to the same principles, so that members of sub-networks can freely assemble to communicate and/or collaborate separate from a main network to which they are members, and can exclude members. Other examples include but are not limited to emailing systems, instant messaging systems, and video conferencing systems.

Other details, aspects and functions of social networking functionalities, including but not limited to those relating to the addition and removal of contacts, the creation and maintenance of online social networks by network administrators, and the addition and removal of members of online social networks, are thoroughly disclosed in the prior art, and these disclosures and are incorporated herein by reference.

Document Management Functionalities

Document management functionalities are also available to members in the collaborative work environment. One example of a document management functionality is the ability to create documents (i.e.: "document" meaning an email, a word processing document (e.g.: a letter, a fax), a spreadsheet, a presentation (e.g.: a Power Point® presentation), an image (e.g.: an Adobe Acrobat® image, a digital photograph), or any other type of document as the term "document" is used in the software application industry). Another example of a document management functionality is the ability to edit documents. Other examples of a document management functionality are the ability to delete documents, to save documents, to organize documents, to file documents, to access documents, to send documents, to receive documents, and to share documents.

Figure 13:
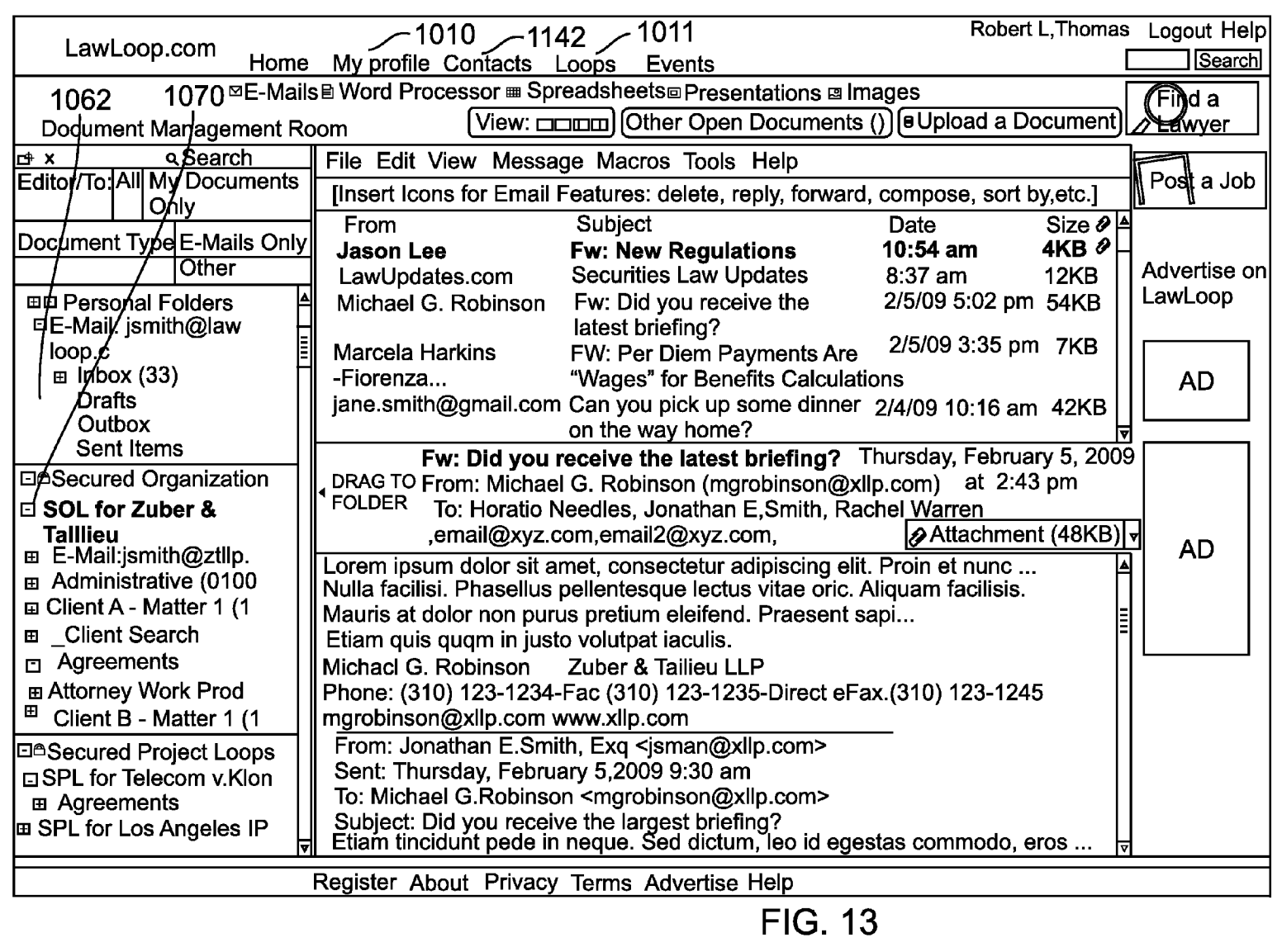

The document management functionalities are accessible to members via a document management tool that allows members to remotely and securely manage (i.e.: "manage" means to create, edit, delete, save, organize, file, access, send, receive, and/or share) documents. The document management tool comprises online software applications available to members that allow members to manage documents remotely (for instance, software applications saved on servers remote from the member that allow the members to manage documents saved on servers remote from the members), including a calendaring tool such as Outlook®, an email tool like Outlook® or Zoho® Mail, a word processing tool such as Word® or Zoho® Writer, a spread sheet tool such as Excel® or Zoho® Sheet, a presentation tool such as Power Point or Zoho® Show, an image viewing tool such as Adobe Acrobat®, a document filing tool like Interwoven® or Zoho® Docs, and/or a contact file management tool such as Outlook® ("contact file" meaning a file containing/storing contact information, but not being associated with a virtual identity, as such term "contact file" is commonly understood in the contact file management software application industry). The document management tool allows a member to access, work with, and manage a system of windows (i.e.: "window" meaning a portion of a computer monitor screen typically wholly or partially separated from other portions of the screen by a graphic border or other means) and folders for managing documents, such as the document management tool depicted at FIG. 13.

Figure 15:
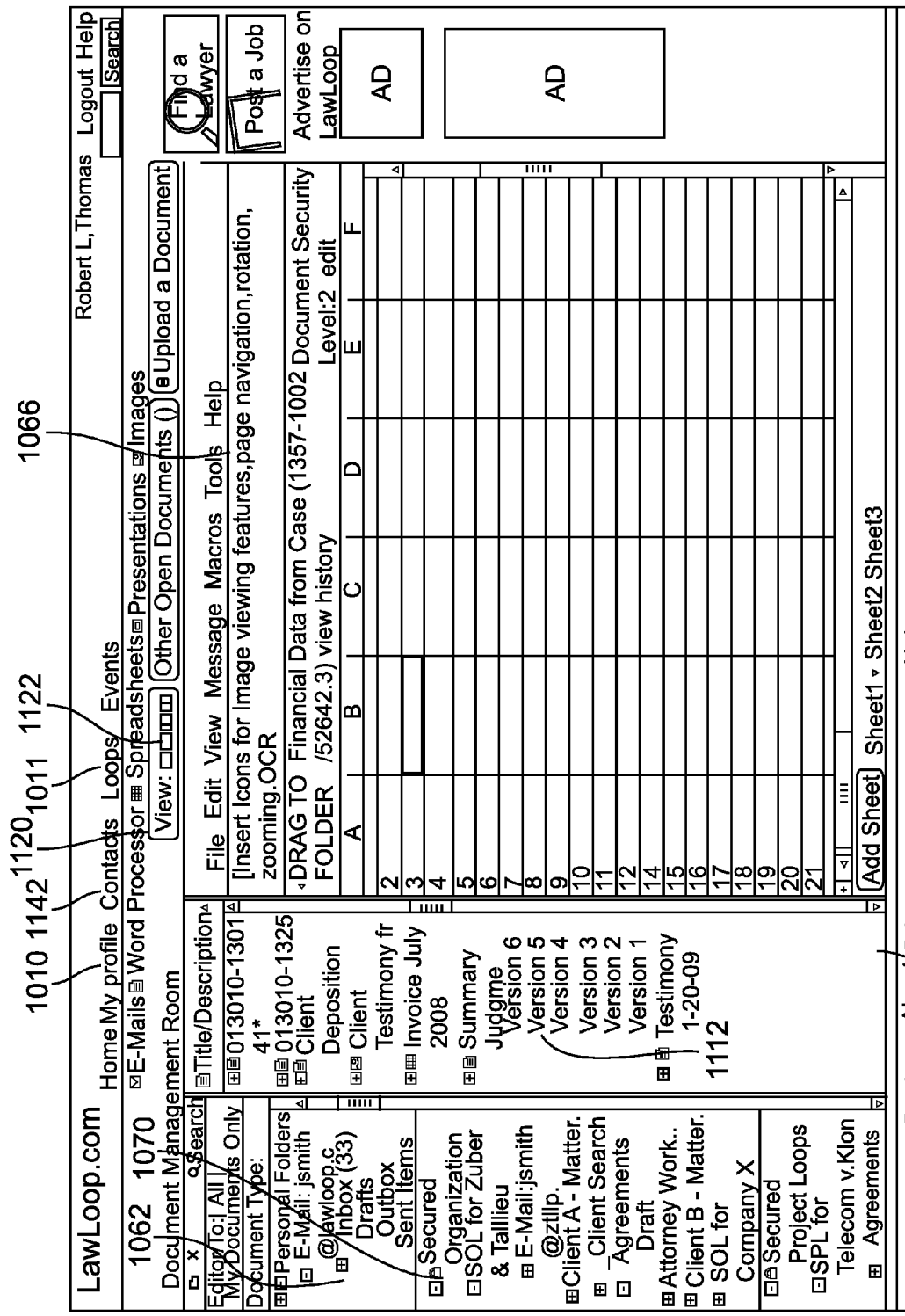
FIG. 15 is an exemplary graphical implementation of another aspect of the present invention showing a document management tool with a document filing tool and spreadsheet tool active.
Figure 16:
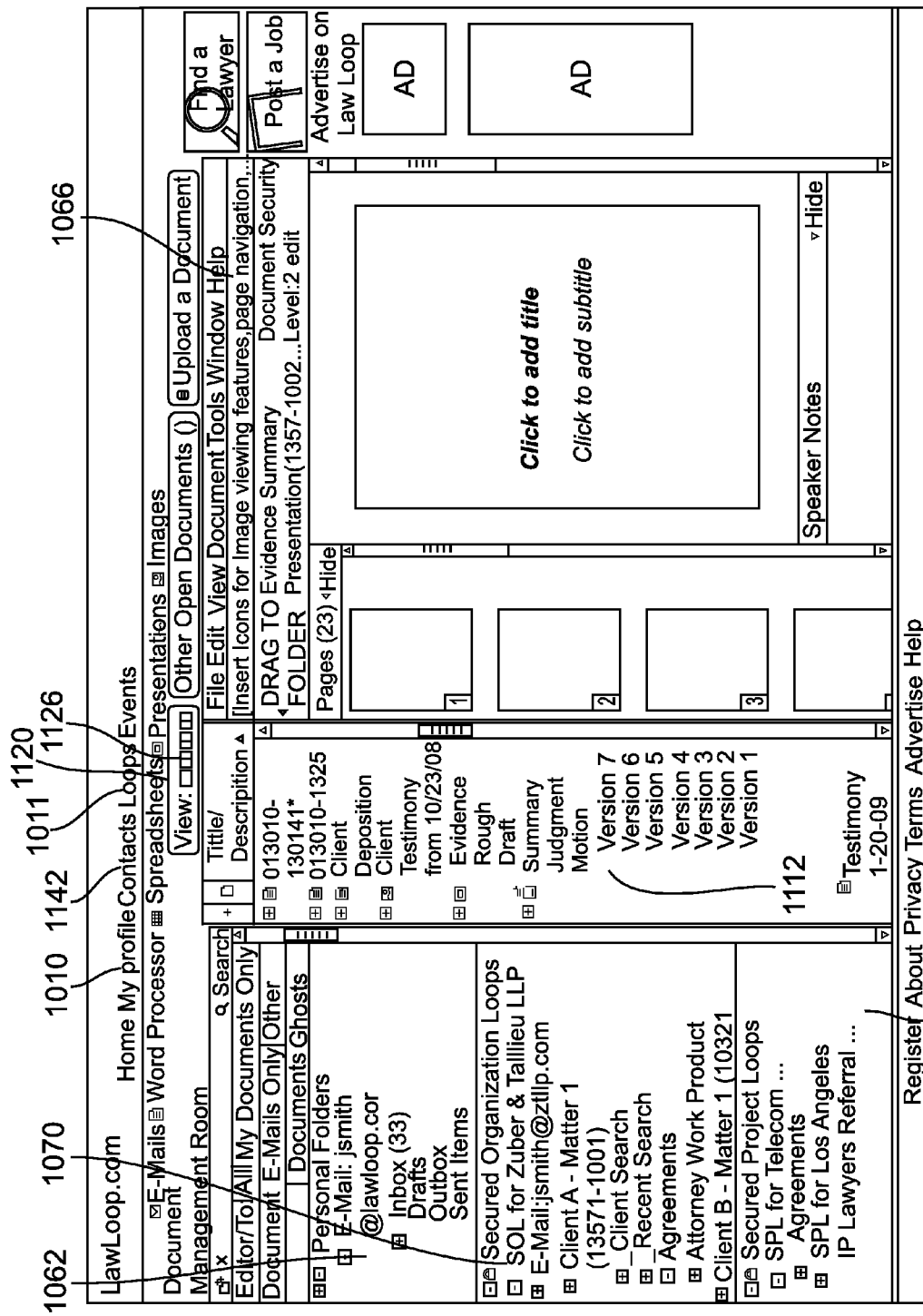
FIG. 16 is an exemplary graphical implementation of another aspect of the present invention showing a document management tool with a document filing tool and presentation tool active.
Figure 17:
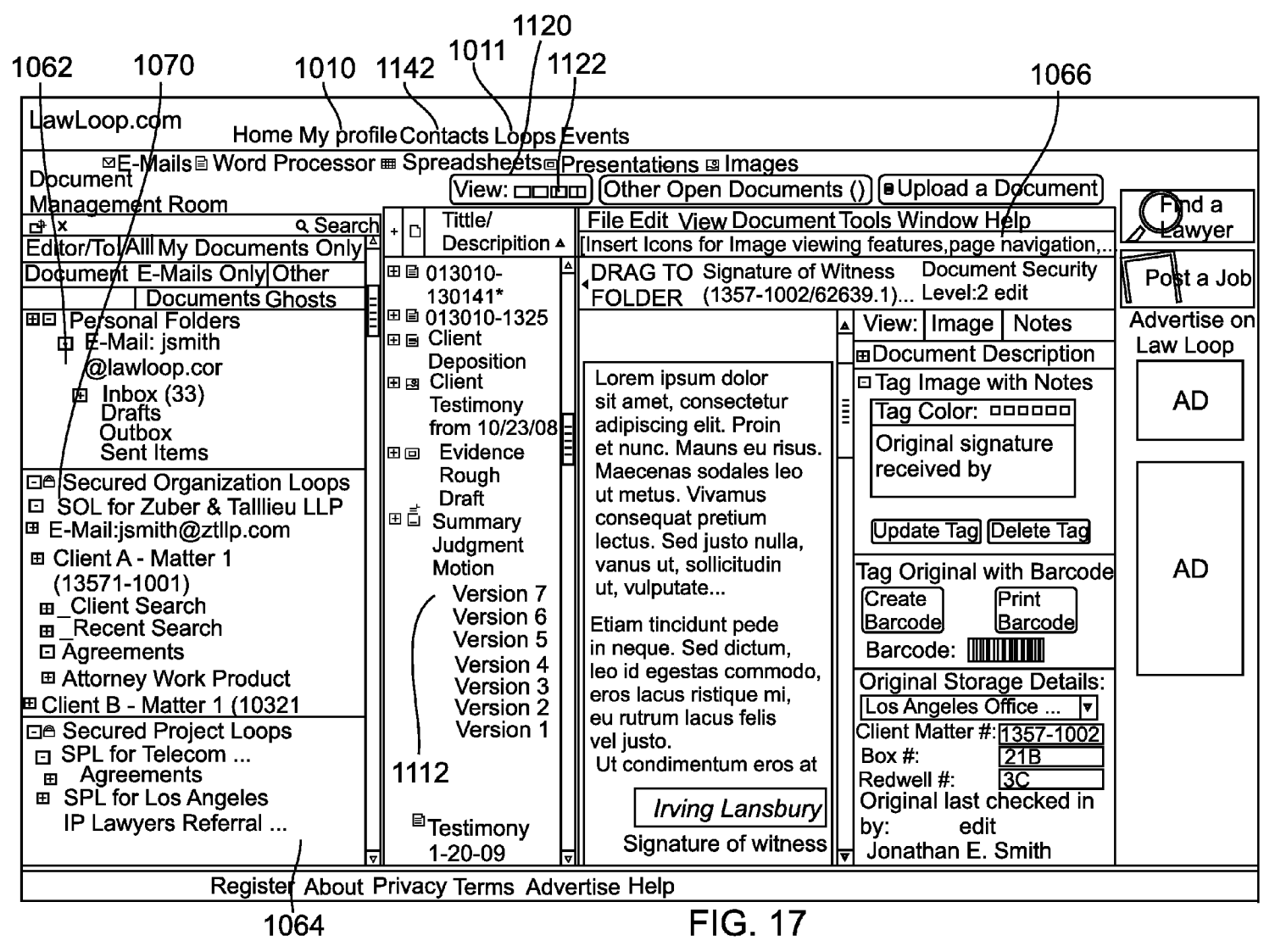

A member described in the example above who accessed his/her virtual identity by typing in a username and password at a login web page could access the document management tool from his/her Home Page by clicking on any of the link 1020, the link 1030, the link 1040, the link 1050 or the link 1060. For example, the member could click on the "Emails" link at 1020, causing a document management tool like the one depicted at FIG. 13, to become active, wherein a document filing tool and an email tool are active. As another example, the member could click on the "Word Processor" link 1030, causing a document management tool like the one depicted at FIG. 14, to become active, wherein a document filing tool and a word processing tool are active. As another example, the member could click on the "Spreadsheets" link 1040, causing a document management tool like the one depicted at FIG. 15, to become active, wherein a document filing tool and a spreadsheet tool are active. As another example, the member could click on the "Presentations" link 1050, causing a document management tool like the one depicted at FIG. 16, to become active, wherein a document filing tool and a presentation tool are active. As another example, the member could click on the "Images" link 1060, causing a document management tool like the one depicted at FIG. 17, to become active, wherein a document filing tool and an image viewing tool are active.

Other details and aspects of these document management functionalities, and these software applications, are thoroughly disclosed and enabled in the prior art, and these disclosures are incorporated herein by reference.

Alias Folders

The document management tool of the present invention presents an additional benefit in the way that it allows members to organize and view the contents of the document management system. Unlike other prior art systems, the present invention allows the users to customize the organization and contents to the member's preference without affecting the core organization of the document folders, or how those documents and folders are seen and used by other members of the network. Throughout this description, the term "alias folders" will be used to describe personalized custom folders created by a member in accordance with this aspect of the invention. The term "alias folders" is not intended to be limiting, but rather descriptive of the function which allows members to create folders which are mapped to their own unique needs. Indeed, any suitable term may be used to describe this function.

Existing document management and electronic file organization systems generally operate by providing a folder system. In many cases, the document management system makes files available to one or more members of an organization. For example, in the context of the familiar Windows Explorer system, users are presented with a set of folders which often contain additional sub-folders and documents nested within the top-most level of folders. Users can generally create any number of folders and sub-folders which may contain unique files or copies of files already present elsewhere in the system.

However, the prior art systems have serious drawbacks in that all users must abide by the same organization of folders or documents. For example, one user might decide to create additional folders for his own use, which folders are then populated with documents that the user wishes to have easy access to. These personalized custom folders will then be visible within the document management system to all other members who might not understand the purpose of the new folders, or who might otherwise be confused by the new folders present in an otherwise orderly system. Furthering the problem, any other user can later come in and modify that first user's personalized custom folders so that the first user is now frustrated in his attempt to use his own personalized custom folders. This problem is exacerbated by users who chose to simply relocate files and folders, rather than creating copies of the folders and files for their own user. In this scenario, a folder or file used by more than one user is now misplaced from the point of view of every other user. Locating that file in its new home may be difficult or impossible for users. At the very least, these scenarios cause unnecessary aggravation and lost productivity for users of the prior art systems.

The alias folders of the present invention eliminate these problems by providing a fully customizable set of folders and files as viewed by the member initiating the changes (or as viewed by someone working on such member's behalf, such as such member's secretary), while maintaining the standard organization expected by every other member of the network. The advantages of alias folder can be more easily appreciated by reference to FIGS. 20-24.

Figure 20:
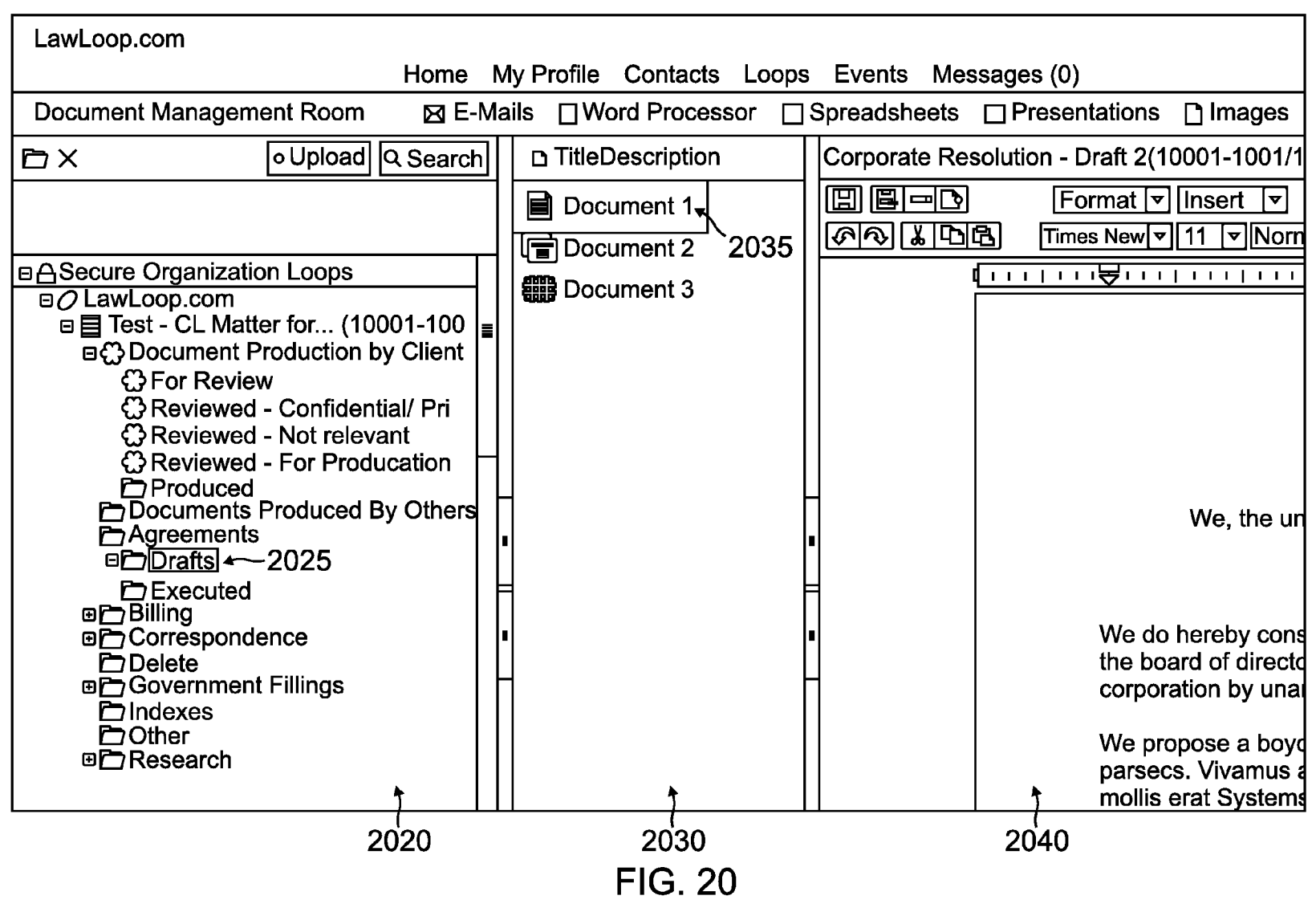

The view in FIG. 20 presents an example of a graphical user interface that may be adapted for use with the present invention. The interface in FIG. 20 is divided into three main sub-windows, each serving a different function. The left-hand sub-window 2020 contains a listing of folders and files belonging to a particular client matter (corresponding to a secure network or loop), which folders and files are available to members of the network in accordance with the present invention. Within sub-window 2020 a particular folder 2025 (titled "Drafts") has been selected by the member. In the center sub-window 2030, the member views the contents of the "Drafts" folder highlighted in sub-window 2020. In this example, the "Drafts" folder contains three documents, titled "Document 1," "Document 2" and "Document 3." The right-hand sub-window 2040 displays the full contents of the selected file "Document 1" 2035. The organization of files and folders shown in FIG. 20 is the standard or default organization that is available to every other member of the network who has access to this client matter.

Figure 21:
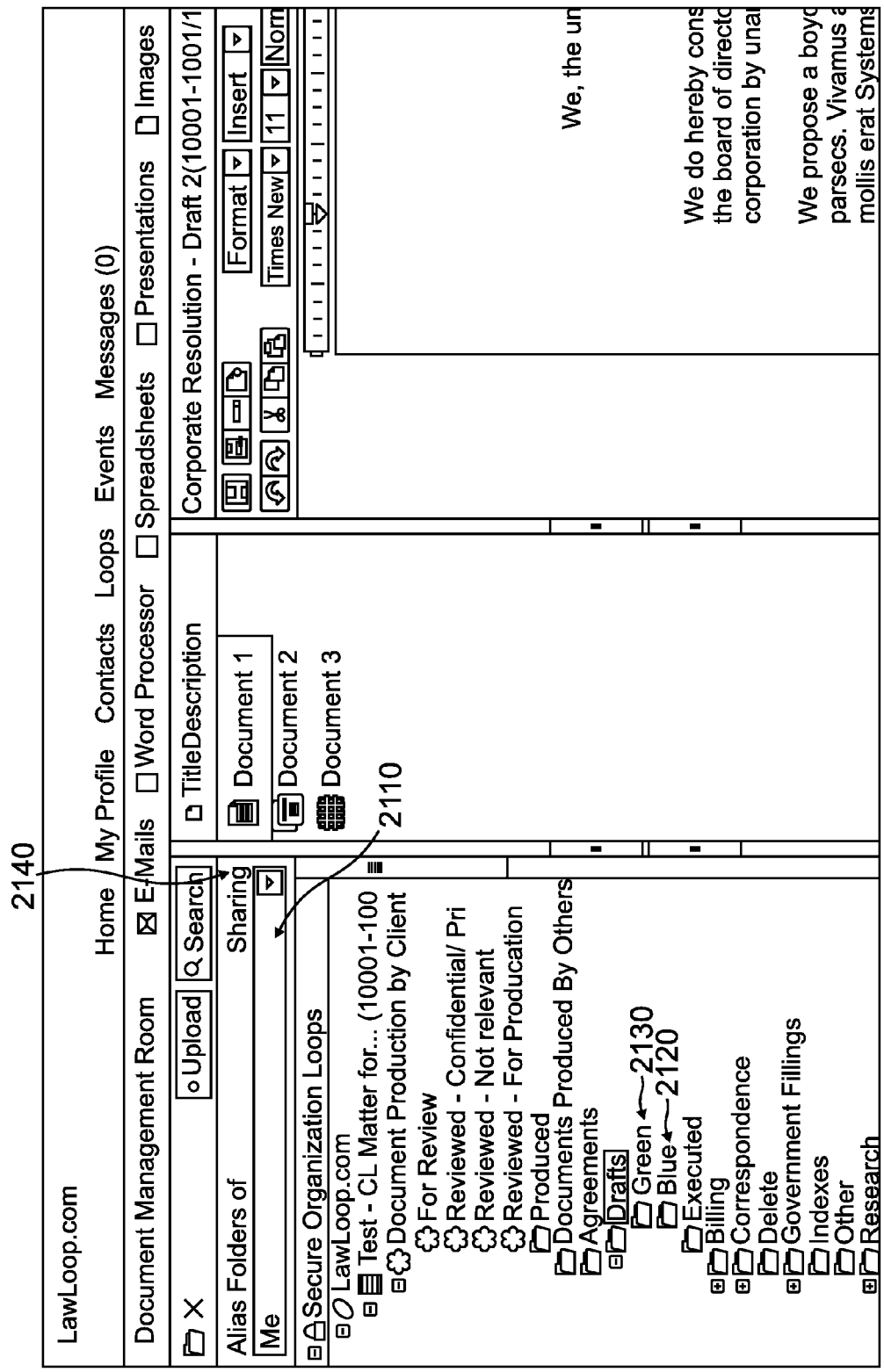
FIG. 21 is an exemplary graphical implementation of another aspect of the present invention in which a member has created two alias folders.
Figure 22:
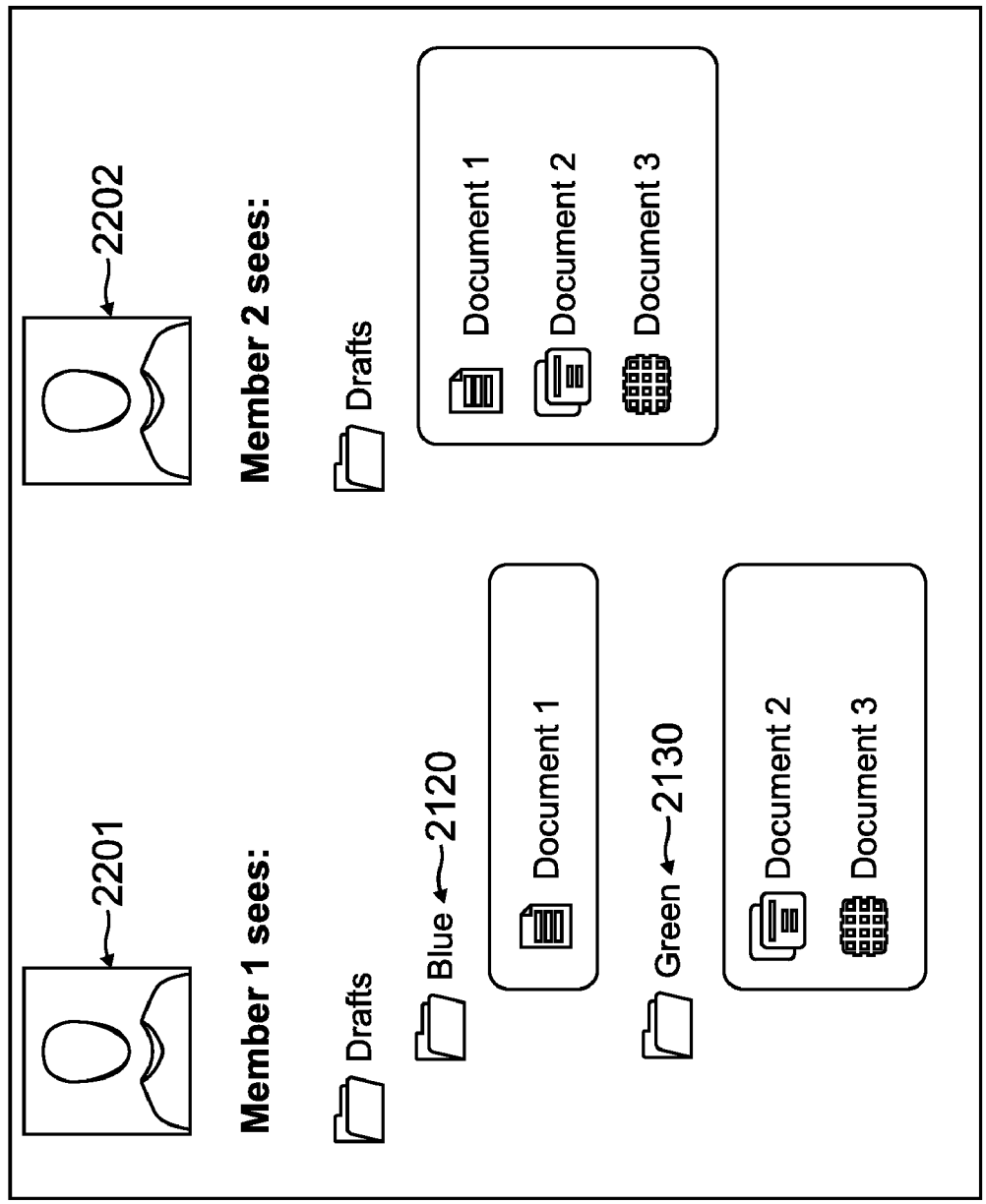
FIG. 22 is a diagram view illustrating the views of alias folders and standard folders as seen by the member who has created the alias folders and a member who does not have access to the alias folders.

According to this aspect of the invention, a first member 2201 may elect to create alias folders so that he can alter the ways that folders and files are presented to him. In the interface presented in FIG. 21, the member selects from a drop-down menu 2110 showing various possible alias folder views. As shown here, the member 2201 elects to view his own alias folders. The member then creates alias folders as shown in FIGS. 21 and 22. It should be noted that the mechanism by which the member initiates creation of the alias folders may be any method suitable for the task and is not intended to be limited by the exemplary view contained in FIG. 21. For example, the member may click on a file menu, input a pre-selected series of keystrokes (such as CTRL-F4, for example), or right click to reveal a menu allowing for alias folder creation. Additional methods for initiating this process are known and appreciated by those of skill in the art.

Referring still to FIG. 21, the member may wish to create alias folders that allow him to locate "Document 1," "Document 2," and "Document 3" more readily than in the standard system. Accordingly, the member chooses to create two alias folders, which he names "Blue" 2120 and "Green" 2130 in this example. Now that the alias folders "Blue" 2120 and "Green" 2130 are available, the first member 2201 is now allowed to populate the alias folders with documents or folders as he sees fit.

In a preferred embodiment of the invention, alias folders are visually distinct from the standard folders available to all other members. For example, the standard folders might be colored yellow or brown as in conventional systems, while alias folders are shaded gray to indicate to the viewer their status as alias folders. Alternatively, the alias folders might be given a distinctive icon or shape that differs from the icon or shape of the standard folders, or the name of the folders might be displayed in a different font, font size, or font color. It should be understood that there are many ways of making alias folders appear visually distinct from other folders and that the particular methods disclosed here are not intended to limit this invention.

In the example shown in FIG. 22, the first member 2201 has chosen to place "Document 1" in the first alias folder 2120, and has placed "Document 2" and "Document 3" in the second alias folder 2130. The member may continue to populate these folders with as many documents as desired. Although the member has placed all three documents of the "Drafts" folders in alias folders, this invention contemplates that any number of documents may be assigned to alias folders. Accordingly, all, some, or none of the documents of this folder may be assigned to alias folders.

To this point we have shown one aspect of this invention, which is to allow the first member 2201 to create alias folders so that he (or someone working on his behalf, such as a secretary) may view documents according to an organization that is more pleasing to him. FIG. 22 also illustrates the advantages of this invention as applied to every other member of the network. While the first member 2201 sees his alias folders, a second member 2202 still sees the original organization of files and folders. Thus, while the first member has his new arrangement that pleases him, the actual organization of the folders remains unchanged for other members of the network. When the second member 2202 searches for "Document 1" she finds it in the "Drafts" folder and is not presented with the "Blue" or "Green" alias folders of the first member 2201. Likewise, every other member of the network sees the standard organization of folders and files.

A practical example gives additional insight into the advantages of the current invention. Turning again to FIG. 20, we see that the "Drafts" folder 2025 is a subfolder of an "Agreements" folder belonging to a particular client matter or project. In this practical application, this particular matter might contain dozens or even hundreds of draft documents dealing with any number of vendors, clients, employees, or associates of the member's client Likewise there may be several employees who are assigned to this project and who contribute, collaborate on, and edit documents with the "Drafts" folder. Each of these employees, however, may have responsibility only for a small subset of draft vendor, client, or employee agreements.

In this example, the first employee, who has responsibility for draft agreements with Acme Co. and Baker, Inc., may wish to create alias folders that contain only draft agreements for Acme Co. and Baker, Inc., respectively. The first member then takes Acme Co. and Baker, Inc. files from the standard "Drafts" folder and places them in the appropriate alias folder. From that point forward, the first member need not search through dozens of irrelevant files to find the Able Co. and Baker, Inc., files he needs. At the same time, though, employees who might need to refer to Able Co. and Baker, Inc., files are still able to locate the files in the "Drafts" folder. Indeed, other members of the network are most likely unaware of the existence of the alias folders.

Continuing with this practical example, suppose that a second member has responsibility for draft agreements that concern the manufacture of widgets and for draft agreements that concern employee 401(K) agreements. The second member can create her own set of alias folders in which she keeps widget agreements and 401(K) agreements. Moreover, because it is likely that widget agreements and 401(K) agreements overlap with Able Co. and Baker, Inc., agreements, the second member must be allowed to create fully independent alias folders that do not affect the organization of either the standard folders or the organization of the first member's alias folders.

Figure 23:
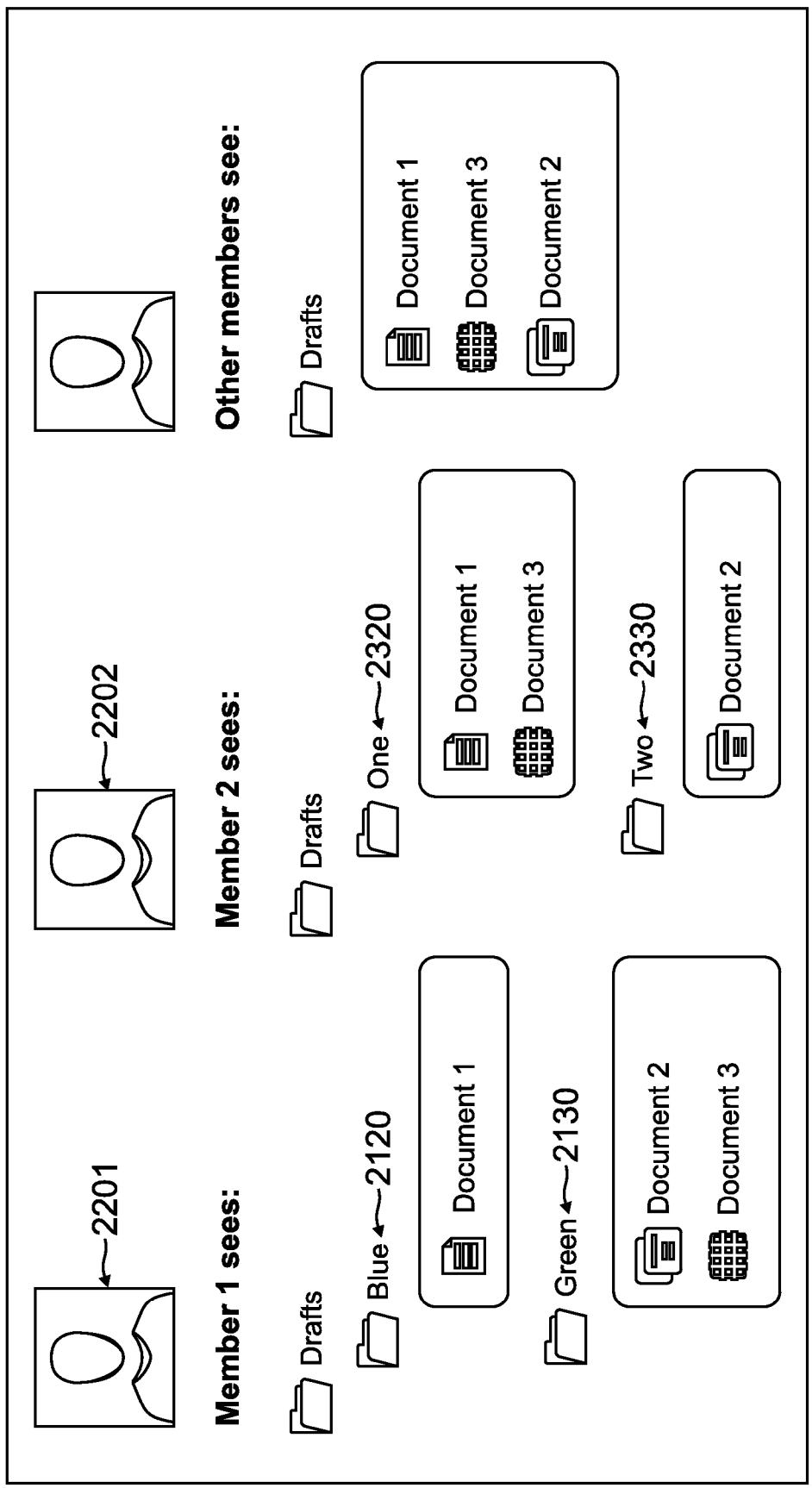
FIG. 23 is a diagram view illustrating the views of alias folders and standard folders as seen by two members who have created distinct alias folders and as seen by all other members who do not have access to the alias folders.

An example of this organization of alias folders is shown in FIG. 23. As in FIGS. 21 and 22, the first member 2201 has created and populated alias folders "Blue" 2120 and "Green" 2130. In this embodiment, the second member 2202 has created her own alias folders, which she has named "One" 2320 and "Two" 2330. The second members alias folders have been populated with those documents that the second member has determined to be most applicable to her own alias folders. Because alias folders are personal to the member who created the alias folders, only that member will see the alias folders. Thus, as shown in FIG. 23, the first member 2201 sees one set of alias folders, the second member 2202 sees a second set of alias folders, and every other member sees the standard arrangement of folders as originally shown in FIG. 20.

It is also an object of this invention to allow members to share their alias folders with other members of the network, if they choose. Returning to the practical example from earlier, the second member 2202 may wish from time to time to see only those files that the first member 2201 has identified as relevant to Able Co. and Baker, Inc. The first member 2201 can allow this by giving alias folder rights to the second member. One way to initiate granting access or permission to alias folders is through the "sharing" icon 2140 shown in FIG. 21.

Figure 24:
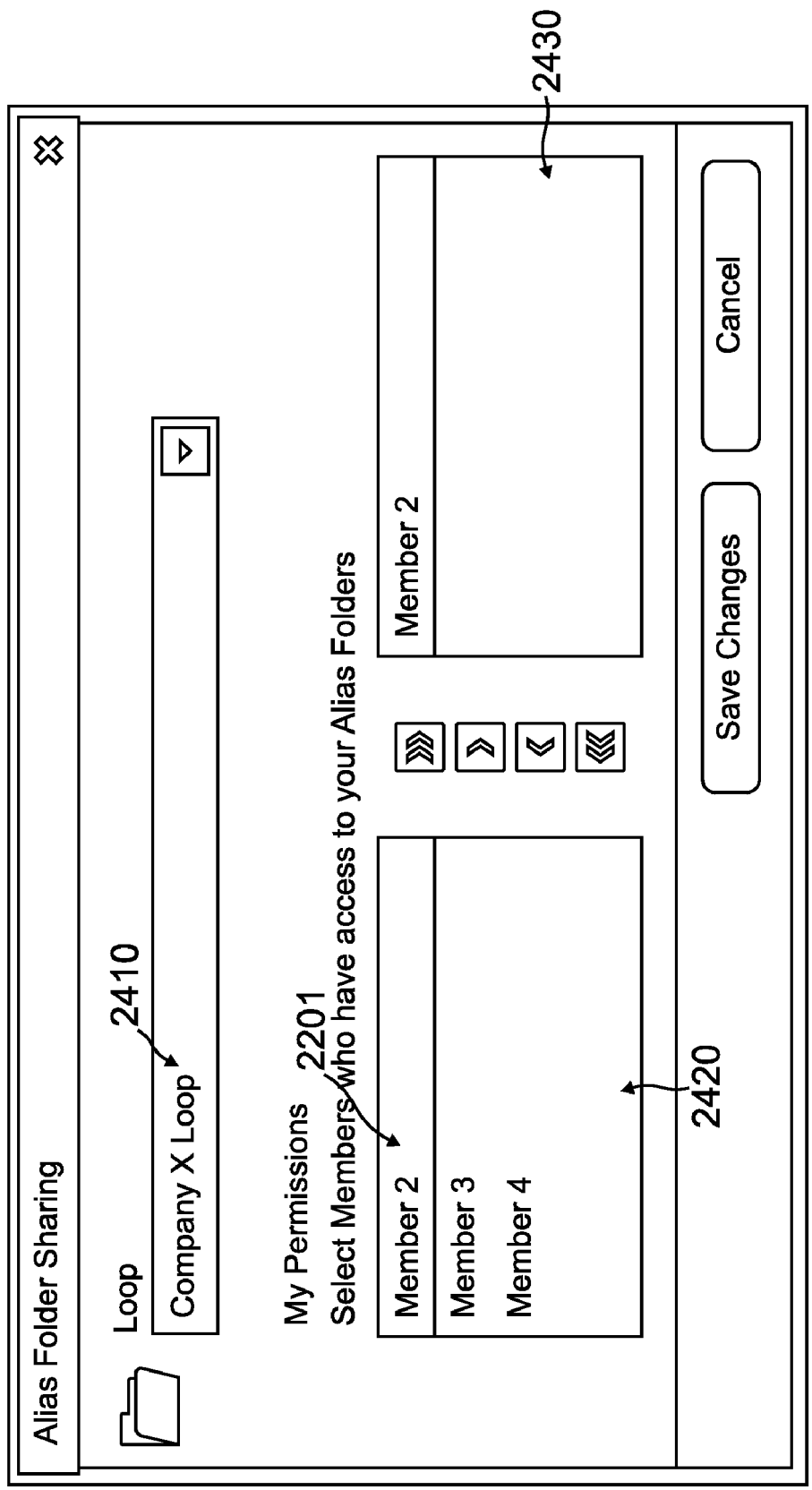
FIG. 24 is an exemplary graphical implementation of another aspect of the present invention illustrating one method of granting access to alias folders to other members of the network.

FIG. 24 is seen from the point of view of the first member 2201 who wishes to give alias rights or permissions to the second member 2202. As shown, the first member first selects the network or loop 2410 to which the alias files at issue belong. The first member 2201 next selects from the universe of network members 2420 which members he wishes to have access to his folders. In this example, the first member elects to share his alias folders only with the second member 2201, who is added to the list of permitted viewers 2430 of the alias folders. According to this invention, the member may select all, some, or none of the member to have access to his alias files, as he so chooses.

Figure 25:
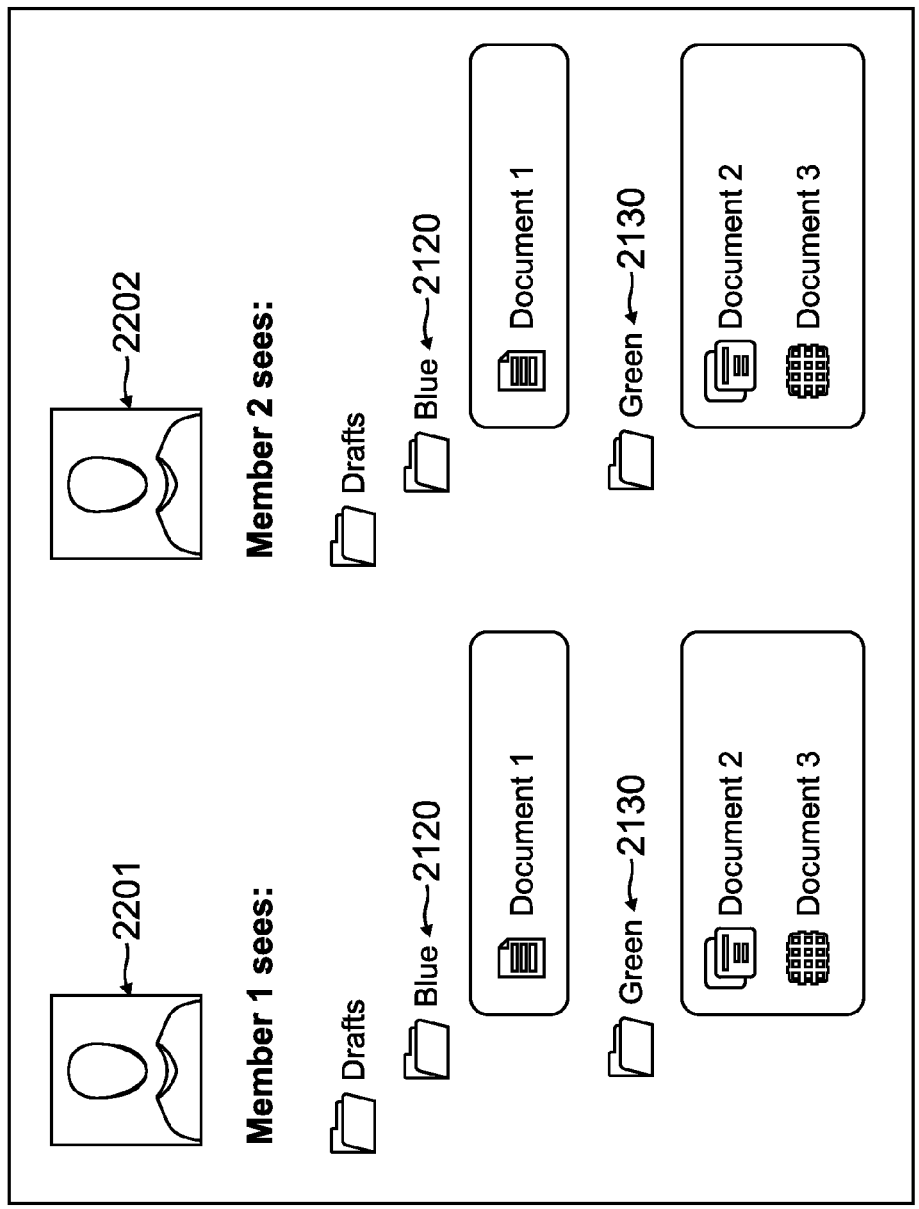
FIG. 25 is a diagram view illustrating the views of alias folders as seen by two members who are both viewing the same set of alias folders.

The result of sharing alias folder permissions is shown in FIG. 25. The second member 2202 has been given access to the first member's 2201 alias folders. Thus, the second member 2202 sees the same view of files and folders as does the first member 2201. It is also an object of this invention to allow a network administrator to grant access to members' alias folders. In other words, the creator of an alias folder may grant other members permission to access his alias folder, or the permission may come from a network administrator who has access to every set of alias folders. This is advantageous in that it allows access to alias folders even if the creator is unavailable or even unwilling to grant access to another member.

Although not shown in the accompanying figures, it is also contemplated that the first member may choose only to grant access to certain alias folders to other members. For example, the first member 2201 may choose to allow the second member 2202 to have access to the "Green" 2130 folder but not to the "Blue" 2120 folder.

A member who has created his own alias folders or who has been given access to another member's alias folders may switch between views of alias folders at any time. As shown in FIG. 21, the member may select between views by using a drop-down menu 2110 or by any other method known in the art, such as right-clicking, tabbed views, or the like. According to this example, member may view his own alias folders, as shown in FIG. 21. Alternatively, the member may choose to view the alias folders of another member who has granted permission to view his or her alias folders. Finally, the member may choose to revert back and view the standard or default view of the folders and files as in FIG. 20. The ability to easily switch between views is attributable to the fact that the alias folders do not actually move the files to new files. Instead, the user is presented with a view that makes it appear as though the files are present in the alias folders, while in reality the files remain in the standard folders in which they were originally located.

Integrative Functionalities

The online collaborative work environment of the present invention offers several integrative functionalities that overlay and are made possible by the combination of various social networking functionalities and document management functionalities. Integrative functionalities provide the mechanism for performing tasks within the collaborative work environment. These integrative functionalities allow members to collaborate within specific modules to work on projects together more easily, efficiently and effectively. Integrative functionalities allow members to manage (i.e.: "manage" meaning to create, edit, delete, save, organize, file, access, send, receive, and/or share) documents within a secure document management system more easily, efficiently and effectively.

Figure 14:
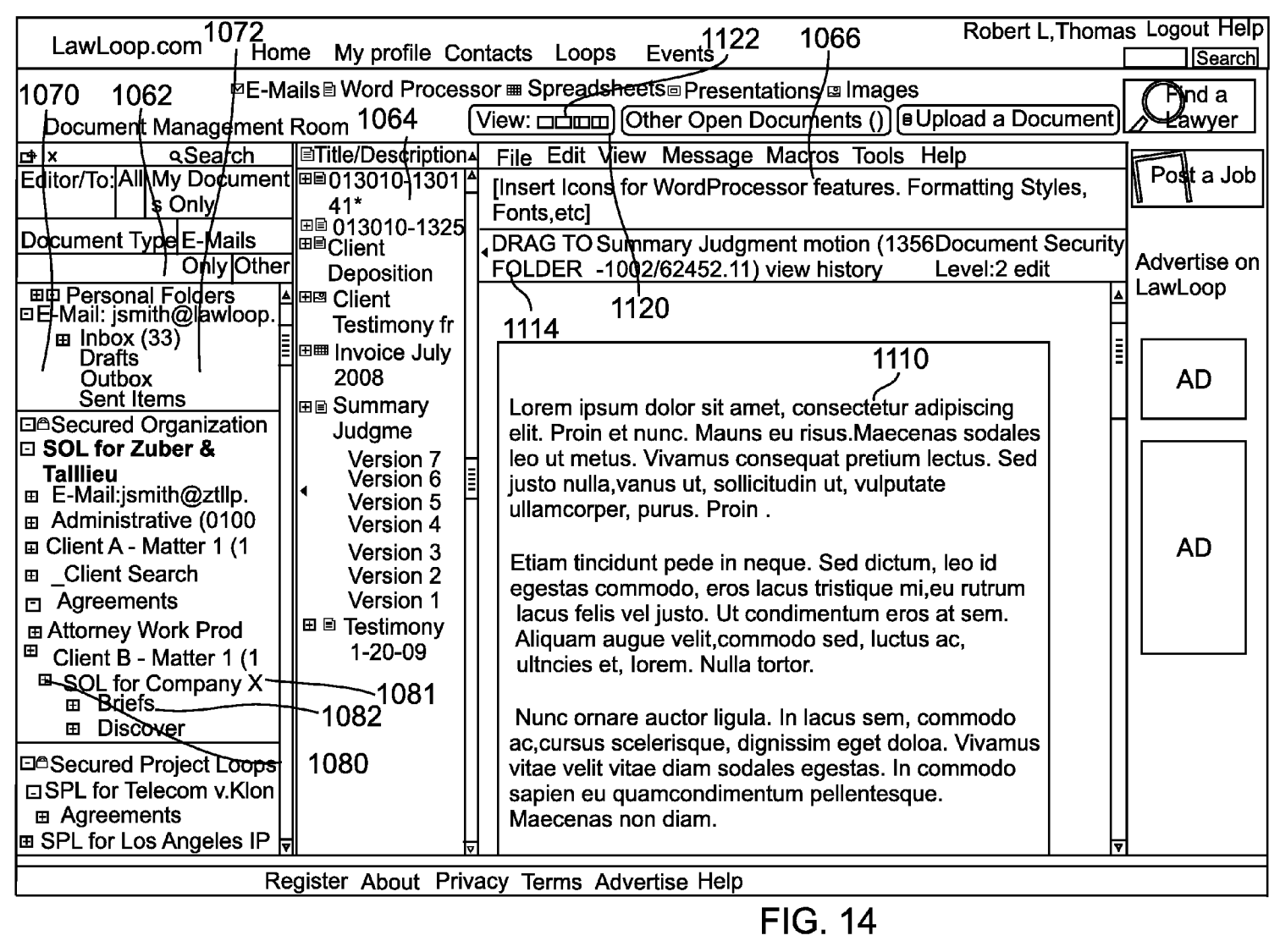

Among the integrative functionalities is the ability for members to easily assemble in a network remotely sharing a document or group of documents or a "room" (i.e.: "room" meaning a group of folders of documents, as the term "folder" is commonly understood in the industry in the context of document filing systems such as Interwoven®), typically stored on a server at a location remote from at least one (and typically most or all) of the members of the network. More particularly, a network administrator can create a network of members, each having member virtual identities, in accordance with the disclosures above, or in accordance with other means for forming networks on social networking websites such as Facebook.com, Myspace.com or LinkedIn.com. This integrative functionality of the present invention allows this network of members to easily, efficiently and securely share a room of folders of documents. For example, FIG. 14 shows a window 1062 displaying rooms of folders of documents including a room 1070 of folders of documents, which room 1070 is the folder 1072 and all of its subfolders, a window 1064 displaying links to documents stored in a folder 1100, which folder is stored in Room 1070 labeled "SOL of Zuber & Taillieu LLP," and a window 1066 displaying the contents of document 1110 linked to by document link 1112. A member of the network may view the contents of any other document stored in folder 1100 by clicking the corresponding document link in window 1064, thereby causing the contents of the corresponding document to appear in window 1066. Similarly, a member of the network may view the contents of any other folder of room 1070 by clicking on the folder, thereby causing the document links to documents stored in the folder to appear in window 1064.

In one embodiment, the present invention contemplates a network of members comprising the attorneys and staff persons of a law firm, the network sharing a secure room 1070 of folders of documents of the law firm (i.e.: "secure" meaning that members and other persons who are not members of the network do not have access (or as complete access) to the room). Upon the hiring of a new attorney who is a member of the online social networking community, this integrative functionality allows the network administrator to grant the attorney the ability to use the document management functionalities described above to manage the room 1070 by simply adding the attorney to the network by, for example, simply clicking on an "Invite Jonathan to a Loop" icon 1017 on the attorney's member virtual identity at FIG. 7. Of course, this integrative functionality makes possible enormous efficiencies for the law firm. For example, referencing the foregoing example, the law firm added the newly hired attorney above without the need to incur the significant labor and capital costs typically associated with granting such a newly hired attorney access to, say, a secure server containing the documents shared by the law firm, such as, for example, the hours that it would have taken for technical personnel of the law firm to install on the attorney's computer the software applications required to allow the attorney to access the server and manage the documents. As another example, the law firm avoided the need to create a new login account for the newly hired attorney—rather, upon addition to the network, the newly hired attorney, by accessing the login account associated with his/her member virtual identity, has access to the online room 1070 shared by the network. Much as the receptionist at the entrance to the physical premises of the law firm recognizes the physicality of the attorney and grants him/her access to the physical premises, the network administrator recognizes the attorney's online member virtual identity, and grants the member virtual identity (and thereby the attorney) access to the online room 1070 shared by the network by simply adding the attorney to the network by, for example, simply clicking the "Invite Jonathan to a Loop" icon 1017 on the attorney's member virtual identity FIG. 7.

A further integrative functionality allows a member to share a first secure room of folders of documents with a first network of members and a second secure room of folders of documents with a second network of members with a single login account. For instance, referencing the example of the immediately preceding paragraph, the newly hired attorney who has been added to the law firm's network, being a first attorney, may be working on a litigation with a second attorney in the representation of a single client having a member virtual identity, and may wish to share one or more documents and/or folders with the second attorney having a member virtual identity and the client. Referencing FIG. 14, the law firm network being a first network, a second network administrator of a second network sharing a second secure room 1080 of folders of documents (i.e. which second secure room is (and which folders and documents therein are) not shared with members of the first network, or any other members, who are not members of the second network), which room 1080 is the folder and all of its subfolders, could add the first attorney, the second attorney and the client to the second network, thereby giving the first attorney, the second attorney and the client access to the second secure room of folders of documents. The first attorney, by accessing the login account of his/her member virtual identity, can, for example, manage document 1110, being a first document, of the first network by, for instance, accessing the documents of a folder 1100, being a first folder, shared by the first network and containing document 1110 by clicking on folder 1100, then accessing the contents of document 1110 by clicking on document link 1112, and then editing or otherwise managing the document; and may similarly, for example, manage a second document shared by the second network by, for instance, clicking on a second folder 1082 of room 1080 containing the second document, thereby causing documents links to the documents stored in the second folder (again, which folder of room 1080 is shared by the second network and not by the first network) to appear in window 1064, clicking on the document link to the second document to cause the contents of the second document to appear in window 1066, and then editing or otherwise managing the second document (such clicking, accessing, editing and managing in each instance above in accordance with methods already disclosed and enabled in the prior art in the context of, for example, document filing tools such as Interwoven® and word processing tools such as Word® and Zoho Writer®, which disclosures are incorporated herein by reference).

A further integrative functionality is a document sharing tool allowing a member to copy or move a document or documents from a room shared by members of a network to a different room shared by members of a different network. For example, referencing the examples of the immediately preceding paragraphs, and FIG. 14, wherein window 1064 displays the document links to the documents stored in folder 1100 (again, which folder of room 1070 is shared by the members of the first network and not the second network), and window 1066 displays the contents of document 1110 linked to by document link 1112, a member who is a member of both the first network and the second network may "click and drag" document 1110 linked to by document link 1112 by clicking via a button on a mouse while the mouse arrow or cursor is juxtaposed over document link 1112, and holding the button down while dragging the mouse arrow or cursor across the computer screen until the mouse arrow or cursor is juxtaposed over folder 1082 of room 1080 and letting go of the button, thereby copying document 1110 of folder 1100 of room 1070 shared by the members of the first network to folder 1082 of room 1080 shared by the second network (i.e.: such that document 1110 is stored in both folder 1100 and folder 1082), thus sharing the document with the members of the second network (as well as members of the first network). Of course, the present invention also contemplates that such clicking and dragging could result in the document being moved (as opposed to copied) to folder 1082 such that, after such moving, it is no longer stored in folder 1100.

A further integrative functionality is another document sharing tool allowing a member to copy or move a document or documents from a room shared by members of a network to a different room shared by members of a different network. For example, referencing the examples of the immediately preceding paragraphs, and FIG. 14, wherein window 1064 displays the document links to the documents stored in folder 1100 (again, which folder of room 1070 is shared by the members of the first network and not the second network), and window 1066 displays the contents of document 1110 linked to by open document icon 1114 (and also linked to by document link 1112), a member who is a member of both the first network and the second network may "click and drag" document 1110 linked to by open document icon 1114 by clicking via a button on a mouse while the mouse arrow or cursor is juxtaposed over open document icon 1114, and holding the button down while dragging the mouse arrow or cursor across the computer screen until the mouse arrow or cursor is juxtaposed over folder 1082 of room 1080 and letting go of the button, thereby copying document 1110 of folder 1100 of room 1070 shared by the members of the first network to folder 1082 of room 1080 shared by the second network (i.e.: such that document 1110 is stored in both folder 1100 and folder 1082), thus sharing the document with the members of the second network (as well as members of the first network). Of course, the present invention also contemplates that such clicking and dragging could result in the document being moved (as opposed to copied) to folder 1082 such that, after such moving, it is no longer stored in folder 1100.

Thus, a member is capable of clicking and dragging one of the documents stored in one folder into a second folder such that the document is shared with members of a second network and is not shared with a member who is not a member of the first network or the second network. The act of clicking and dragging a document enables quick movement of documents and other items within the collaborative work environment. It is notable that this system of sharing information with members of one network but not of another network, permeated throughout this detailed description of the embodiments, ensures data security and protection of confidential information and enables members to come together for the purpose of collaboration within the present invention.

Referencing the examples above, upon the copying of document 1110 from folder 1100 of room 1070 to the second folder of room 1080, a further integrative functionality of the present invention causes a link to document 1110 to appear on the profile of the network virtual identity of the second network (i.e.: where it did not appear prior to such copying), as well as on the profile of the network virtual identity of the first network (i.e.: where it also appeared prior to such copying). In another embodiment, upon the moving of document 1110 from folder 1100 of room 1070 to the second folder of room 1080, a further integrative functionality of the present invention causes a link to document 1110 to appear on the profile of the network virtual identity of the second network (i.e.: where it did not appear prior to such moving), and to disappear from profile of the network virtual identity of the first network (i.e.: where it appeared prior to such moving). Similarly, in another embodiment, upon the copying of document 1110 from folder 1100 of room 1070 to the second folder of room 1080, a further integrative functionality of the present invention causes a link to document 1110 to appear on the profile/s of one or more members the second network (i.e.: where it did not appear prior to such copying), as well as on the profile/s of one or more members of the first network (i.e.: where it also appeared prior to such copying). In another embodiment, upon the moving of document 1110 from folder 1100 of room 1070 to the second folder of room 1080, a further integrative functionality of the present invention causes a link to document 1110 to appear on the profile/s of one or more members of the second network (i.e.: where it did not appear prior to such moving), and to disappear from profile/s of one or more members of the first network (i.e.: where it appeared prior to such moving). Of course, in regard to each instance above, the present invention contemplates that the link to the document can appear on a web page or web pages of the relevant network virtual identity or member virtual identity other than a web page of the profile of the relevant network virtual identity or member virtual identity, respectively.

Figure 18:
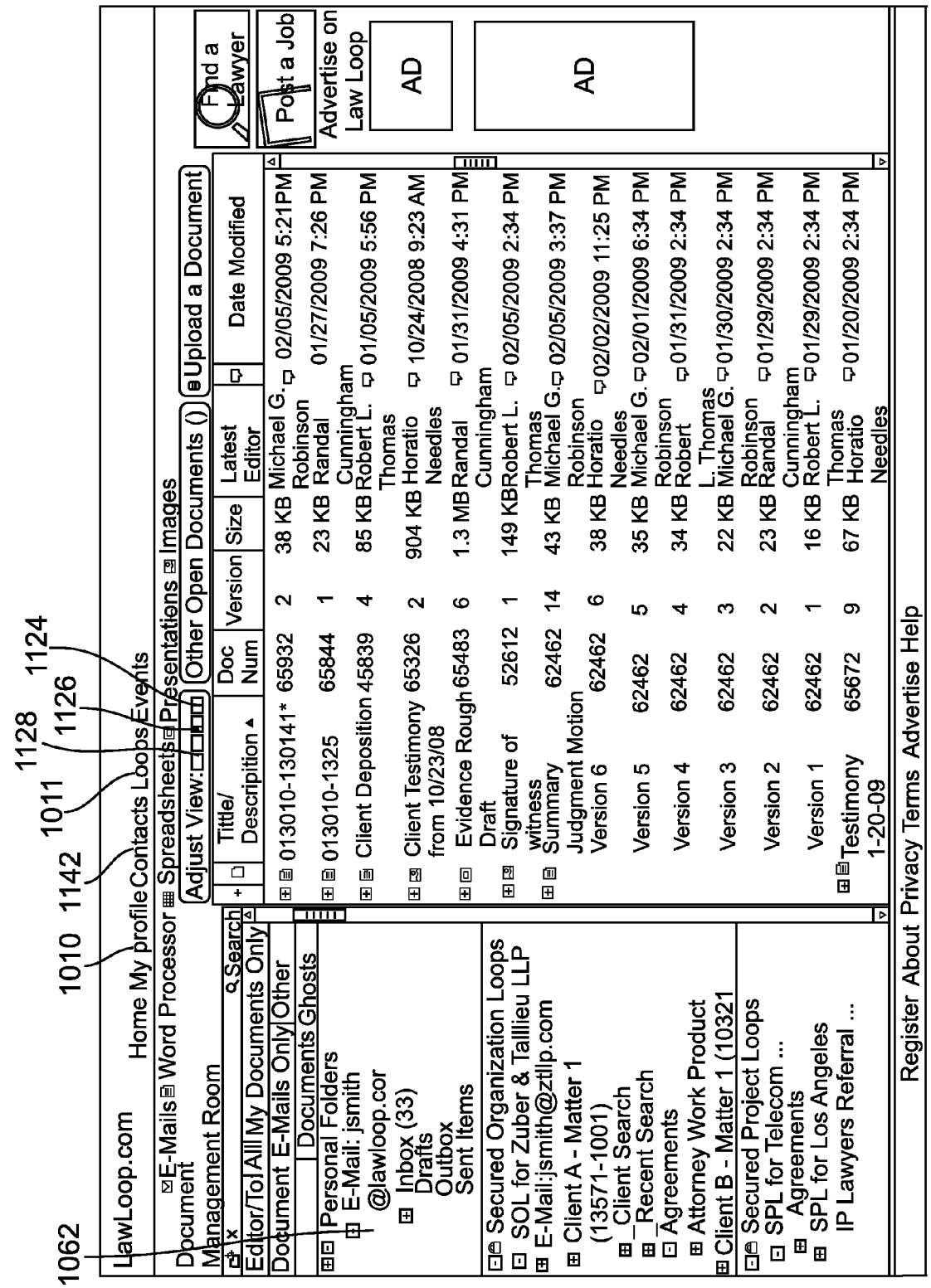
FIG. 18 is an exemplary graphical implementation of another aspect of the present invention showing a document management tool with a document filing tool and word processor tool active in a multi-column format.

The document management tool also includes one or more alternate viewing tools. The alternate viewing tool allows a member to alternate between different views of the document management tool, each view containing a different combination of window 1062, window 1064 and/or window 1066. For example, referencing the examples above, and referencing the alternate viewing tool 1120 on FIG. 14, which FIG. 14 depicts a three-window viewing containing all of window 1062, window 1064 and window 1066, the member of the first network may select an alternate view by clicking on icon 1122, thereby causing the view at FIG. 18, consisting only of window 1062 and window 1064 to appear. Similarly, referencing FIG. 18, the member may click on icon 1124, thereby causing the three-window view of FIG. 14 to appear. Similarly, referencing FIG. 18, the member may click on icon 1126, thereby causing a view consisting only of window 1064 and window 1066 to appear. Similarly, referencing FIG. 18, the member may click on icon 1128, thereby causing a view consisting only of window 1066 to appear. In another embodiment, clicking on icon 1128 would cause a view consisting only of window 1062 to appear. In another embodiment, clicking on icon 1128 would cause a window consisting only of window 1064 to appear. It will be understood that the alternate viewing tool, and the document management tool generally, can be customized in other ways to present windows, folders and documents so that collaboration is most effective based on the viewing preferences of members and of the network within which members are active, thereby providing for a flexible, user-friendly environment designed to foster collaboration.

Figure 9:
FIG. 9 is an exemplary graphical implementation of another aspect of the present invention showing a member profile as viewed by members who are contacts.

A further integrative functionality is a member-virtual-identity-to-software-application contact-information-importation tool allowing members to import contact information from member profiles via their member virtual identities into the document management tool. For example, a second member could initiate a draft of a letter to a first member by clicking on an icon 1130 on the first member's profile as depicted in FIG. 9, thereby causing the word processor tool depicted in FIG. 14 to appear, except that no folder would be highlighted in window 1062 or window 1064, and window 1066 would contain a letter template addressed to the first member at mailing address 1140, the mailing address 1140 having been imported into the word processing tool, and into the new document, from the first member's profile.

A further integrative functionality is a member-virtual-identity-to-software-application contact-information-importation tool allowing a member to perform a mail merge (i.e.: "mail merge" meaning the production of multiple documents from a single template form and a structured data source, pursuant, for example, to pre-addressed letters, envelopes and/or mailing labels for mass mailings from a word processing document template which contains fixed text, that will be the same in each output document, and variables that act as placeholders that are replaced by text from the data source, as such term "mail merge" is commonly understood in the industry) with the word processor tool, whereby the word processor tool imports contact information from the profiles of the contacts of the member. Thus, the present invention effectively addresses the absurdity of requiring each of hundreds or thousands or more of contacts of a person to acquire, update, maintain, and ensure the accuracy of the person's contact information. Rather, using the present invention, all of the contacts of a member may access and utilize in the context of a document management tool contact information of a single contact file, in the form of the member's profile, maintained by the member, who is, of course, typically the person best able to update, maintain, and ensure the accuracy of his/her contact information.

Figure 19:
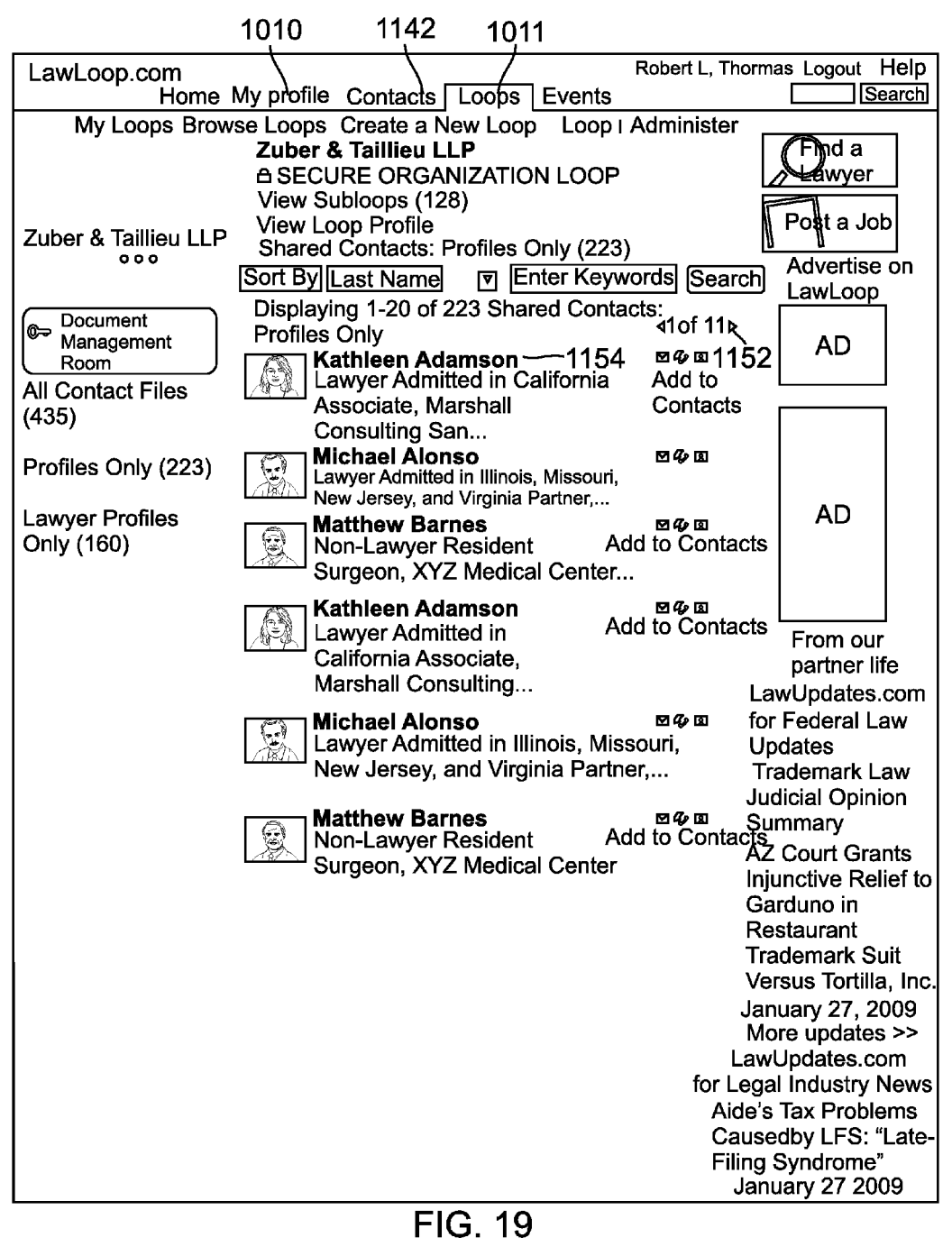

A further integrative functionality is a contacts sharing tool allowing members of a network to share a pool (i.e.: collection) of contacts, such that members not of the network of members do not have access to the pool of contacts. For example, in one embodiment, a member of a network could click on icon 1150 on a network profile depicted at FIG. 12 (which icon members not of said network would not be able to view or click), thereby causing a web page displaying a list of links to the profiles of all contacts of all members of the network, like the web page depicted at FIG. 19, to appear, which links could be listed in alphabetical order based on the last name (or first name) of the contacts corresponding to the links, or based on many other ranking criteria. If links to all of the contacts do not appear on one web page (for example, if the links are for any reason too numerous to appear on one web page), the member could browse additional lists of contacts of members of the network by clicking icon 1152 on FIG. 19, causing in the instance of each such click a web page displaying a list of links to profiles of additional contacts of the members of the network to appear, with each subsequent list a continuation of the immediately preceding list. The member could click on a link 1154, thereby causing the profile of the contact corresponding to the link to appear. The member could use the member-virtual-identity-to-software-application contact-information-importation tool to initiate a draft of a letter to any contact in the pool of contacts by clicking on an icon on the profile of the contact, thereby importing contact information from the profile of the contact into the word processing tool and into the new document, as set forth above; or to perform a mail merge with the word processor tool, thereby causing the word processor tool to import contact information from the profiles of the contacts of the pool of contacts of the network, as set forth above.

As another example, in another embodiment of the present invention, each member of a network may select contacts to contribute to the pool of contacts shared by the members of the network. For example, a member could chose to contribute a contact of the member to the pool of contacts shared by the network by clicking on icon 1146 on the profile depicted in FIG. 9 corresponding to a contact of the member, thereby causing the contact to be contributed to the pool of contacts shared by the members of the network. In another embodiment of the present invention, a member of more than one network may click on icon 1146 on the profile depicted in FIG. 9 corresponding to a contact of the member, thereby causing a drop-down menu displaying a list of all of the networks of which the member is a member to appear, and the member could click on a network among the list, thereby causing the contact to be contributed to the pool of contacts of that network and not to the pool of contacts of other networks of which the member is a member. The member may view and browse the contacts of such shared pool of contacts of the network to which he/she contributed the contact by clicking on icon 1150 on the profile of the network, depicted at FIG. 12 (which icon members not of said network would not be able to view or click), thereby causing a web page displaying a list of links to the profiles of all contacts of all members of the network, like the web page depicted at FIG. 19, to appear, and then clicking on icon 1152 to view and browse through additional lists of links to profiles of contacts of the members of the network, and then click on a link 1154 to view the profile of the contact corresponding to the link to appear, all as set forth above in the preceding examples. The member may use the software application contact information importation tool to initiate a draft of a letter to any contact in the pool of contacts by clicking on an icon on the profile of the contact, thereby importing contact information from the profile of the contact into the word processing tool and into the new document, as set forth above; or to perform a mail merge with the word processor tool, thereby causing the word processor tool to import contact information from the profiles of the contacts of the pool of contacts of the network, as set forth above.

A further integrative functionality of the present invention allows members to use the contact file management tool to share and collectively manage contact files. Such contact file management, similar to that of the document management tool described above, allows members to share contact files online in a remote, secure environment. The present invention also allows for managing access to contact files within the inclusion/exclusion framework above, so that, for example, a member not belonging to a network of members does not have access to that network's pool of shared contact files. Typically, a contact file includes/stores contact information of a person, whether or not a member, such as but not limited to business addresses, home addresses, business phone numbers, home phone numbers, mobile phone numbers, business fax numbers, home fax numbers, email addresses, etc.

A further integrative functionality is a contact file sharing tool allowing members of a network to use the contact file management tool to share a pool (i.e.: collection) of contact files (i.e.: as opposed to contacts, as per the example above), such that members not of the network of members do not have access to the pool of contacts. For example, in one embodiment, a member of a network may click on icon 1160 on a network profile depicted at FIG. 12 (which icon members not of said network would not be able to view or click), thereby causing a web page displaying a list of links to the contact files of all members of the network, like the web page depicted at FIG. 19, to appear, which links could be listed in alphabetical order based on the last name (or first name) of the persons corresponding to the contact files corresponding to the links, or based on many other ranking criteria. If links to all of the contact files do not appear on one web page (for example, if the links are for any reason too numerous to appear on one web page), the member may browse additional lists of contact files of members of the network by clicking icon 1152 on FIG. 19, causing in the instance of each such click a web page displaying a list of links to additional contact files of the members of the network to appear, with each subsequent list a continuation of the immediately preceding list. The member may click on a link 1154, thereby causing the contact file corresponding to the link to appear. A member-virtual-identity-to-software-application contact-information-importation tool allows the automatic importation of contact information from a profile of a contact into a new created (i.e.: upon addition of the contact by the member) or existing contact file corresponding to the owner of the profile (i.e.: such that a business phone number cited on the profile is imported into a business phone number field in the contact file, a business address cited on the profile is imported into a business address field in the contact file, a mobile phone number cited on the profile is imported into a mobile phone number field on the contact file, an email address cited on the profile is imported into an email address field cited in the contact file, and so on for every type of contact information cited on the profile), such the a newly created contact file is completed or an existing contact file is updated, as relevant. Furthermore, upon an updating of the profile by its owner, the member-virtual-identity-to-software-application contact-information-importation tool allows the automatic importation of updated contact information from the profile into the contact file, such that the contact file is automatically kept up to date without any further effort by the member. The member may initiate a draft of a letter to the person corresponding to any contact file in the pool of contact files by clicking on an icon on the contact file, thereby importing contact information from the contact file into the word processing tool and into the new document, as set forth above in regard to shared pools of contacts; or may perform a mail merge with the word processor tool, thereby causing the word processor tool to import contact information from the contact files of the pool of contact files of the network, as set forth above in regard to shared pools of contacts.

As another example, in another embodiment of the invention, each member of a network could select contact files to contribute to the pool of contact files shared by the members of the network. For example, a member may choose to contribute a contact file of the member to the pool of contact files shared by the network by clicking on an icon on the contact file, thereby causing the contact file to be contributed to the pool of contact files shared by the members of the network. In another embodiment of the present invention, a member of more than one network may click on an icon on the contact file, thereby causing a drop-down menu displaying a list of all of the networks of which the member is a member to appear, and the member may click on a network among the list, thereby causing the contact file to be contributed to the pool of contact files of that network and not to the pool of contact files of other networks of which the member is a member. The member may view and browse the contact files of such shared pool of contact files of the network to which he/she contributed the contact file by clicking on icon 1160 on the profile of the network, depicted at FIG. 12 (which icon members not of said network would not be able to view or click), thereby causing a web page displaying a list of links to the contact files of all members of the network, like the web page depicted at FIG. 19, to appear, and then clicking on icon 1152 to view and browse through additional lists of links to contact files of the members of the network, and then click on a link 1154 to view the contact file corresponding to the link to appear, all as set forth above in the preceding examples. A member-virtual-identity-to-software-application contact-information-importation tool allows the automatic importation of contact information from a profile of a contact into a new created (i.e.: upon addition of the contact by the member) or existing contact file corresponding to the owner of the profile, such the a newly created contact file is completed or an existing contact file is updated, as relevant. Furthermore, upon an updating of the profile by its owner, the member-virtual-identity-to-software-application contact-information-importation tool allows the automatic importation of updated contact information from the profile into the contact file, such that the contact file is automatically kept up to date without any further effort by the member. The member may initiate a draft of a letter to the person corresponding to any contact file in the pool of contact files by clicking on an icon on the contact file, thereby importing contact information from the contact file into the word processing tool and into the new document, as set forth above in regard to shared pools of contacts; or could perform a mail merge with the word processor tool, thereby causing the word processor tool to import contact information from the contact files of the pool of contact files of the network, as set forth above in regard to shared pools of contacts.

It should be understood that to import one's contact information means to transfer or copy the information contained within a profile or a contact file from the profile or contact file, respectively, to another file or location or software application. This importation may involve copying an underlying file containing that contact information. Importation may also involve transferring contact information from any location and does not need to be from a profile or a contact file. For example, a member's or other person's contact information may be imported from an email tool or calendaring tool, or from a remote device such as a hard drive, a flash drive, or a phone.

It is also to be understood that contact files, and contact information contained therein, may be transferred or imported from one member virtual identity to another, and member virtual identities to network virtual identities and vice versa. Similarly, the contact file management tool is capable of transferring or importing a member's or network's entire contact list. The contact file management tool according to the present invention is therefore capable of managing a member's and a network's contact list, and does so while working with several contact applications.

Additionally, contacts can be imported using the click and drag method and can be accessed via an icon on a member virtual identity or network virtual identity. Contacts are therefore easily chosen shared from member to member. For example, a member wishing to add another member's contact information clicks on that member's member virtual identity and drags it to his or her contact list. Other methods are also contemplated, such as importing via a pull-down menu, or right-clicking and selecting an import option. One can also access other contacts of a member and import their contact information by choosing an icon representative of their contact information and dragging to their member virtual identity profile as discussed above.

Contact information imported from one file format or program is identified and categorized appropriately so that a member's contact information is accurately reflected after importation. For example, regardless of whether contact information is imported from a member virtual identity or to a member virtual identity from another source, the present invention contemplates that cell phone numbers will be identified as cell phone numbers and fax numbers will be identified as fax numbers, and so forth. It is therefore understood that the present invention contemplates that formatting across file formats will not prevent accurate importation or transfer of contact information.

The examples above focus on the word processor tool, but the examples also apply to the email tool, the spreadsheet tool, the presentation tool, and other software applications, and such uses are contemplated by and included within the scope of the present invention.

Other details and aspects of the member virtual identity to software application contact information importation tool, including but not limited to those relating to importation of contact information and mail merge, are thoroughly disclosed in the prior art, and these disclosures are incorporated herein by reference.

Security and Access Control

The present invention contemplates that networks may erect methods of preventing some members from participating in a network. Additionally, members may be required to present identification credentials to enable a member virtual identity and/or to access certain networks. For example, to ensure a member is who they say they are, they may be required to properly present identification credentials, such as a password, to access or enable their member virtual identity. Many other methods of identity verification may be employed to ensure security is maintained. For example, verifying a member's identity may include, in addition to entry of a password (whether entered via text input, entered via image input, or entered orally), thumbprint verification, fingerprint verification, eye-scan verification, voice verification, or DNA verification.

Further security protocols may be used to ensure that only certain members be allowed to access certain networks. For example, a network of lawyers from separate law firms collaborating on a project may be required to prove they are members of one of the firms, either through a password, a digital certificate on the computer they are accessing the network from, or via any other known method of verifying access. Broader networks of lawyers not specific to a particular project may require proof of licensure of a country's or state's bar examiners or court system.

A network administrator may be assigned control over member access to the collaborative work environment and the networks therein. A network administrator may be assigned the ability to add or delete members from a particular network. One method of adding or deleting members is to click on an icon representative the member's virtual identity. A network administrator may also be add or delete members in bulk; one method of doing so it is to highlight several members' virtual identities and drag them to an icon representative of a network virtual identity.

Detailed Description of the Claimed Invention as Shown in Additional Figures

FIG. 1 shows a secure, network-based collaborative work environment 100 according to the present invention. The secure, network-based collaborative work environment 100 allows one or members 120 of an online community 110 to access and utilize several integrative functionalities 150 as fully described herein. The one or more members may be grouped together into one or more networks of members 130.

Members 120 of the online community 110 have an account with the online community 110 which defines a member virtual identity 640 associated with the member 120. The member's account and virtual identity 640 form a member profile which conveys information about the member 120. The member virtual identity 640 is an online representation of that member 120 and may take many different forms. For example, a member's 120 webpage or collection of web pages may be considered a member virtual identity 640. The member virtual identity 640 may be represented by an icon.

A network 130 within the online community 110 may also have an account with the online community 110 which defines a network virtual identity 650 associated with the network 130. The network's account and virtual identity 640 form a network profile which conveys information about the network 130. The network virtual identity 650 is an online representation of that network 130, may take many different forms, and like a member virtual identity 640, may be represented by an icon. Also like the member virtual identity 640, a network 130 may be represented by a webpage or collection of web pages that may be considered a network virtual identity 650.

The secure, network-based collaborative work environment 100 and online community 110 are available and accessible to the one or more members 120 via a portal 140 to the "cloud" in a computing environment. The secure, network-based collaborative work environment 100 and online community 110 are therefore resident in a server-based architecture in the "cloud" in which the portal 140 allows the one or more members 120 to collaborate with one another. The present invention therefore contemplates that the secure, network-based collaborative work environment 100 and online community 110 are an extension of cloud computing in which a plurality of integrative functionalities 150 are accessible to the one or more members 120 as an overlay of collaborative networking and collaborating tools.

The plurality of integrative functionalities 150 available to the one or more members 120 includes at least a communications module 160, a translation module 170, a document management module 180, and a software applications module 200. At least one additional integrative functionality 150 includes a license module 190 which controls monitoring of licensing of the one or more members 120. License module 190 further includes a sub-module 380 for performing the task of license monitoring. Each of these integrative functionalities 150 include several sub-modules for executing various algorithms associated with the integrative functionalities 150 and allow the one or more members 120 to perform different tasks within the online community 110.

The communications module 160 of the integrative functionalities 150 includes sub-modules for video conferencing 210, voice conferencing 220, email 230, various forms of instant messaging 240, calendaring 250, and translation 260. The translation module 170 of the integrative functionalities 150 includes a text sub-module 270 that further includes capabilities for translating emails, documents, and chats 300. Translation module 170 also includes a video translation sub-module 280 and a terms-of-art translation sub-module 290.

The document management module 180 includes several sub-modules designed to facilitate collaboration amongst members 120 who are working with various documents. The document management module 180 includes a viewer sub-module 310 that has further sub-modules that enable the viewing of native documents 350, provide various options for windows management 360, and various options for folder management 370. The document management module 180 also includes an editor sub-module 320 and a security sub-module 330. Addition sub-modules for the document management sub-module 180 include an upload/download sub-module 340 that manages the upload and download of documents within the online community 110.

The software applications module 200 includes several sub-modules offering software applications to the one or more members 120. Each of these sub-modules allows the one or more members 120 to conduct various activities within the online community 110. For example, the software applications module 200 includes an email sub-module 390 which allows a member 120 to access email applications for managing, sending, receiving, deleting, storing, and aggregating email. The document, spreadsheet, and presentation sub-module 400 allows a member 120 to access one or more applications for word processing, spreadsheeting, and preparing presentations. A calendar sub-module 410 allows access to applications for maintaining a calendar of important dates and meetings. Many additional applications sub-modules are contemplated with the present invention. Another such sub-module may be an image viewing sub-module 420 which allows a member 120 to easily view documents with a number of different applications for viewing different kinds of documents, particularly in connection with the document, spreadsheet, and presentation sub-module 400. Note that the image viewing sub-module 420 may be different than the viewer sub-module 310 associated with the document management module 180.

It is to be noted that many different applications are contemplated for the email sub-module 390, the document, spreadsheet, and presentation sub-module 400, the calendar sub-module 410, the image viewing sub-module 420, and the other applications sub-modules contemplated by the present invention.

Figure 2:
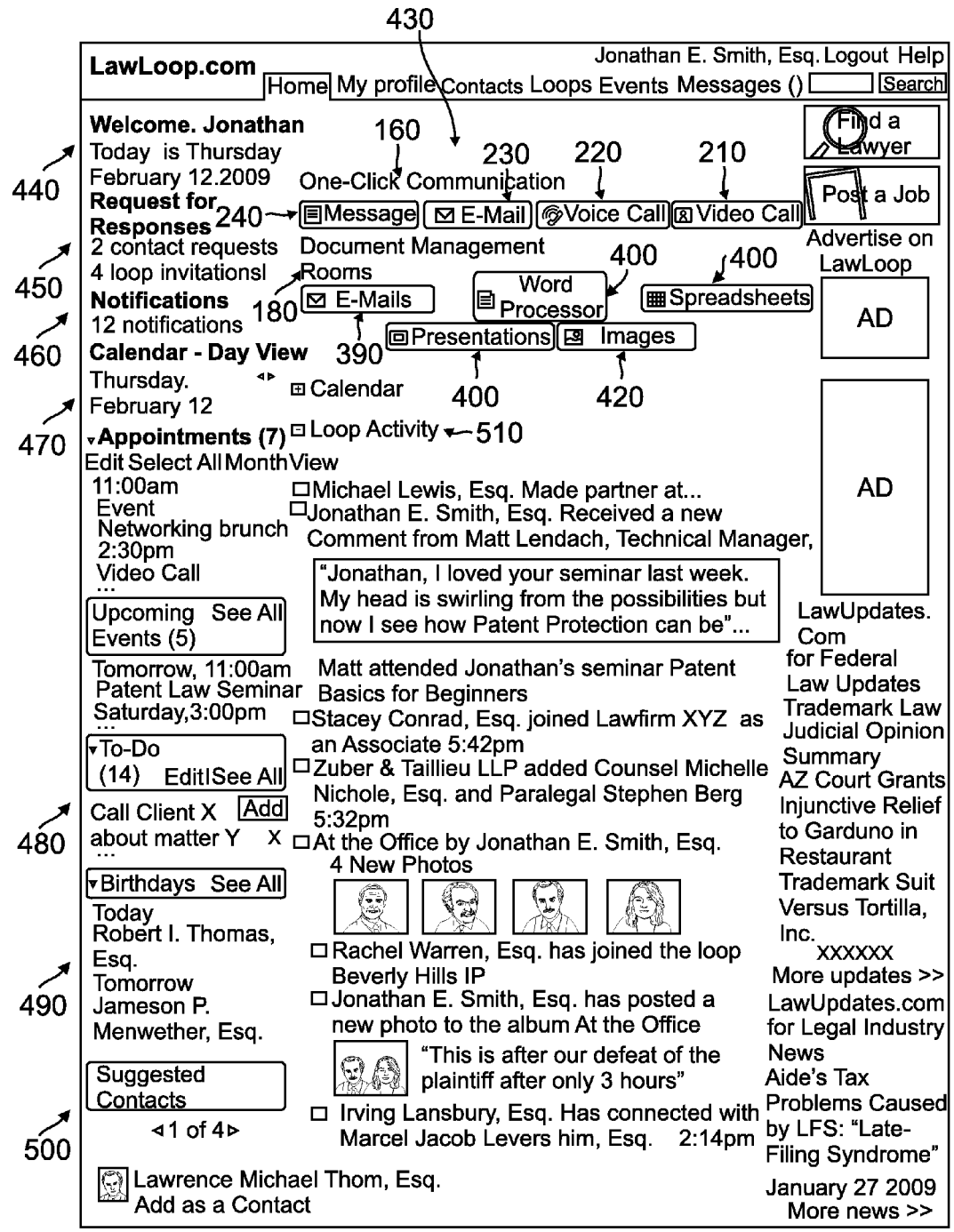
FIG. 2 is an exemplary graphical implementation of one aspect of the present invention showing a member's virtual identity and having several integrative functionalities accessible.

FIG. 2 shows an exemplary graphical implementation of one aspect of the present invention. In FIG. 2, a member's 120 home page on the graphical user interface 140 is depicted. The member's 120 home page 430 of the online community 110 on the graphical user interface 140 shows one embodiment of several integrative functionalities 150 accessible to the member 120.

At the home page of the online community 110 on the graphical user interface 140, integrative functionalities such as the communications module 160 and document management module 180 are shown. In this embodiment, the communications module 160 has sub-modules 210, 220, 230 and 240 available as one-click options for a member 120. Each of these one click options are available to the member 120 as "buttons" on the graphical user interface 140.

FIG. 2 also shows sub-modules of the document management module 180 available as "buttons" on the graphical user interface 140. A member 120 may click on the "button" on the graphical user interface 140 for any sub-module. In FIG. 2, sub-modules 390, 400, and 420 are shown. Some sub-modules may have more than one "button." For example, in FIG. 2, a member may click on a different part of the graphical user interface 140 for the sub-module 400 for word processing, the sub-module 400 for spreadsheets, and the sub-module 400 for presentations.

FIG. 2 also shows other information available to a member 120 at the home page 430 of the online community 110. The present invention contemplates that many different types of information can be depicted on the home page 430 of the online community 110, and therefore this description of exemplary information provided is not intended to be exhaustive or to limit the invention to the precise forms disclosed. Information presented may include a virtual member identity 440, a request for responses section 450, and a notifications section 460. Other information presented may include a calendar section 470 and to-do section 480. A birthdays section 490 and a suggested contacts section 500 may also be included. Different views of any of these types of information may also be provided. For example, calendar section 470 may be provided in a day view, a monthly view, in a weekly view, or any other type of calendar view. Drop-down or drop-across menus may also be accessible to select from different views and further information available within any of these sections of information. Members 120 may also be able to click on any information listed on the home page 430 and go to a different screen providing further information about what was just clicked on.

Other types of information available in FIG. 2 include loop activity 510. As with other types of information described above, a member 120 may click on any sub-information section listed under loop activity 510 and enter into a loop 520.

Figure 3:
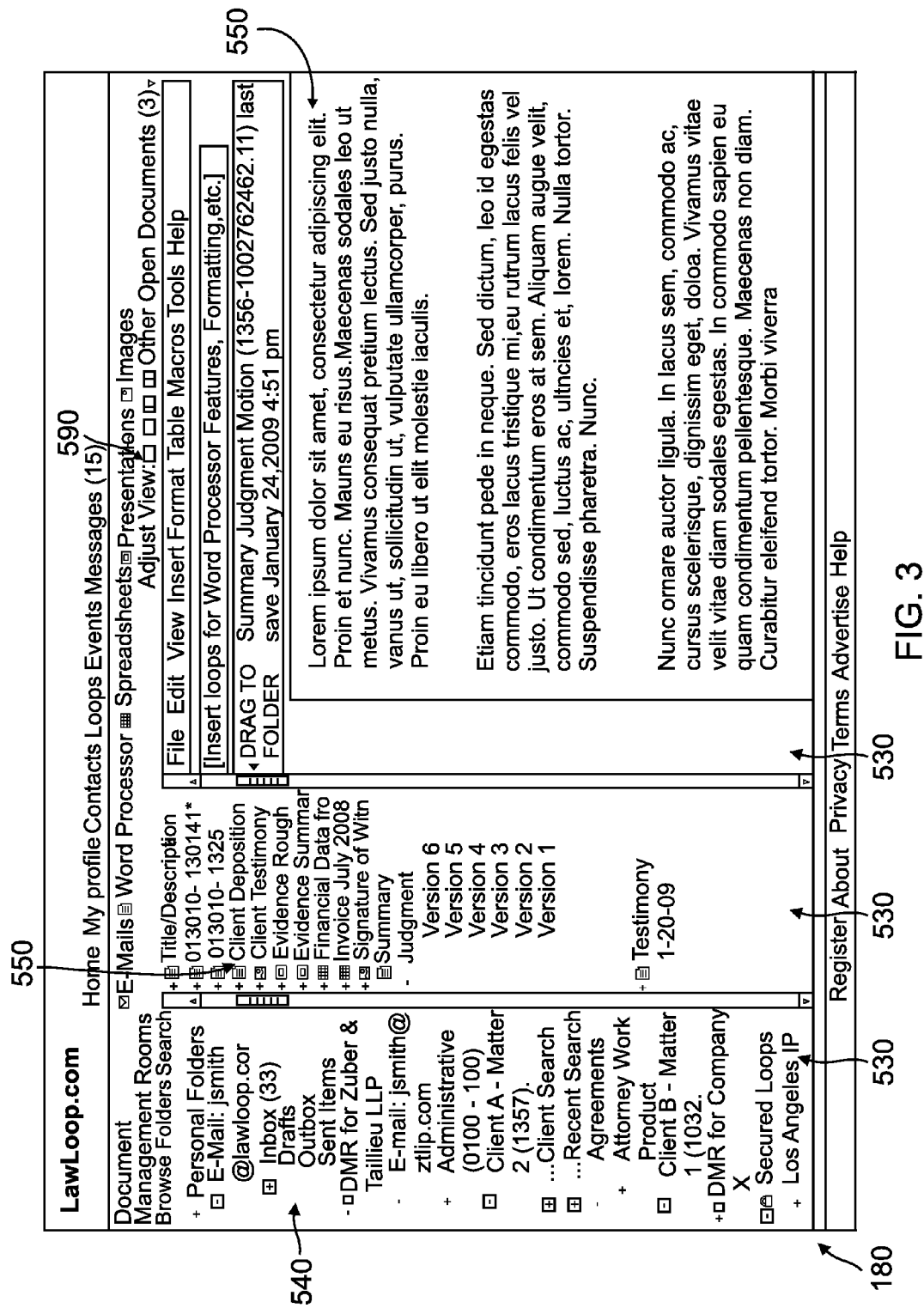
FIG. 3 is an exemplary graphical implementation of another aspect of the present invention showing multiple views of a document management system.

FIG. 3 shows an exemplary graphical implementation of another aspect of the present invention showing multiple windows 530 of a document management module 180. In FIG. 3, document management module 180 is divided into a folder window 530 showing multiple folders 540 as managed by the viewer sub-module 310, windows sub-module 360, and folders viewer sub-module 370. FIG. 3 also shows a document window 530 showing multiple documents 550 within a particular folder 540 as managed by the viewer sub-module 310, windows sub-module 360, and folders viewer sub-module 370. A viewer 590 in window 530 shows a document 550 selected from the list of documents 550.

The document management module 180 of the integrative functionalities 150 provides members 120 with several features for working with, editing, manipulating, and managing documents. Within the larger context of collaboration within a secure loop in the online community 110, members 120 and groups or networks of members 130 can come together with the present invention and work with documents using one or more of the integrative functionalities 150. Actions that a member 120 may take using the document management module 180 include clicking on an icon on a member virtual identity 640 existing in the context of the online community 110 and thereby giving the member 120 associated with such member virtual identity 640 access to (or retracting access of the member 120 associated with such member virtual identity 640 to) a document management room shared by a network that at least some members 120 associated with member virtual identities 640 do not have access to. Other actions include dragging a document stored in a first folder containing documents shared by members of a first network of members 130 (and not shared with members 120 not of said first network 130) to a second folder containing documents shared by members of a second network 130 (and not shared with members 120 not of said second network 130), such that the document is shared with members of the first network 130 and members of the second network 130, wherein at least one of said members of said second network 130 is not also a member 120 of said first network 130.

Still other actions include dragging a document stored in a first folder containing documents shared by members of a first network of members 120 (and not shared with members 120 not of said first network 130) to a second folder containing documents shared by members of a second network 130 (and not shared with members 120 not of said second network 130), such that the document is shared with members of the first network 130 and members of the second network 130, and such that the document appears on the second network virtual identity 650 page (e.g.: the Secure Loop Profile page), wherein at least one of said members of said second network 130 is not also a member 120 of said first network 130.

Figure 4:
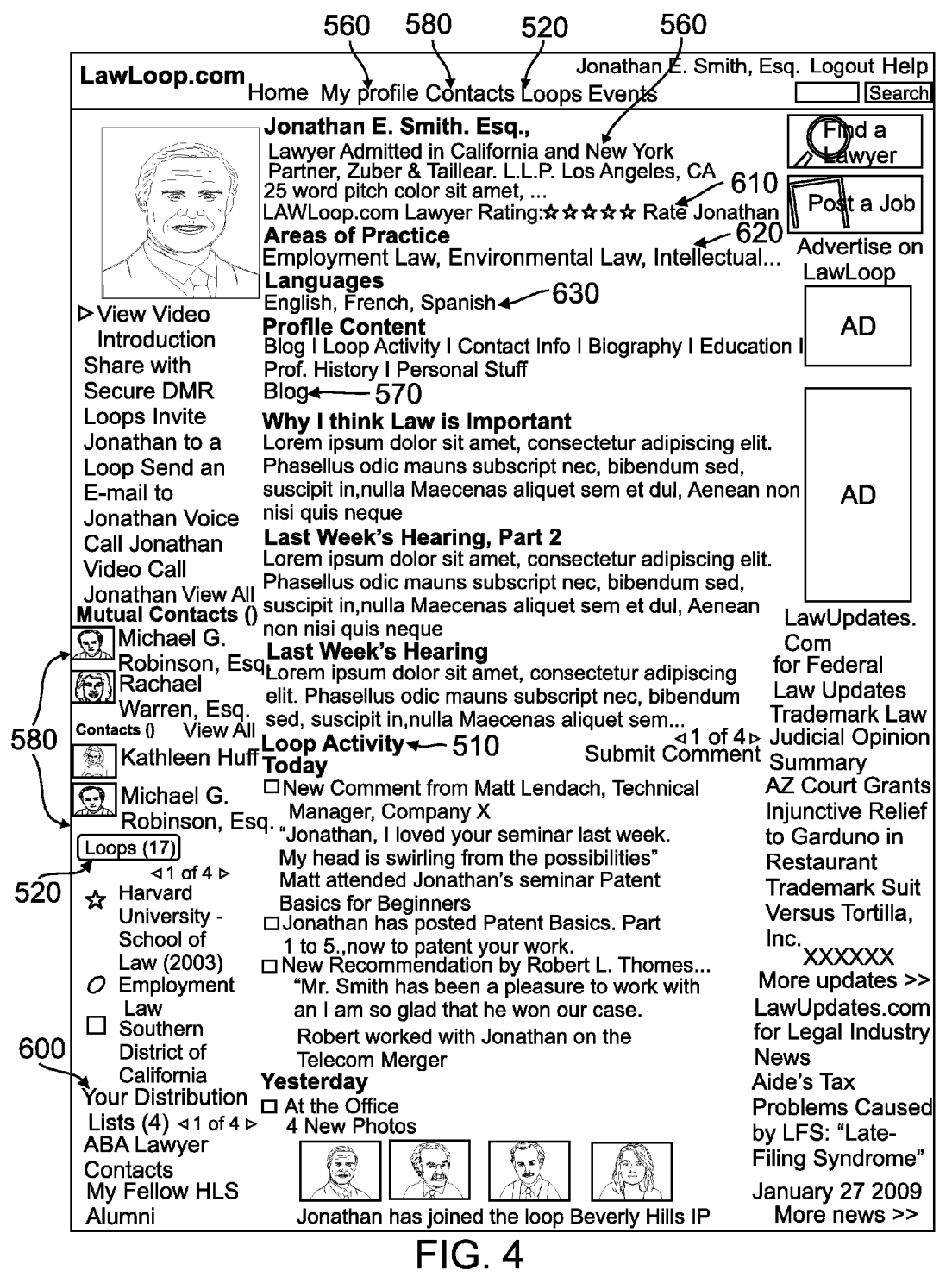

FIG. 4 is an exemplary graphical implementation of another aspect of the present invention showing a profile page 560 of a member 120. The profile page 560 of a member 120 shows various information about the member represented by the member's virtual identity 640, including areas of practice 620, languages 630, a lawyer rating 610, a blog section 570, and loop activity 510. The profile page 560 may also show a contact file management tool 580, loops 520, and distribution lists 600. Links may be provided to content such as the profile page 560 itself, the contact file management tool 580, loops 520, or any other content available to members 120 of the online community 110. Clicking on an icon representative of the member virtual identity 640 displays the information on the profile page 560. A member's 120 contacts 660 may be represented by an icon, and another member 120, regardless of network 130 membership, may simply import his or her contact information by clicking on the icon and dragging it to his or her contacts section of the member virtual identity 640.

The contact file management tool 580 is an integrative functionality 150 that may include files (i.e.: like Outlook® contact files) which consist of contact information imported from at least one of other member virtual identity 640. Allowing importation of a member's 120 contacts 660 from another member's 120 member virtual identity 640 eliminates the need to get someone's business card and have a secretary or assistant add their information to new Outlook® contact file. Therefore, with this integrative functionality 150 of the present invention, one can very simply add contacts from a member's virtual identity 640, and a contact file will be created automatically.

The contact file management tool 580 is a powerful tool for allowing members 120 to easily import contacts 660 from other members' member virtual identities 640. It also allows members 120 to quickly share contacts 660 with each other and within networks, and quickly and seamlessly import and export contacts 660 from third party applications. Therefore, the contact file management tool 580 is configured to integrate one's contacts from multiple sources, and to integrate new contacts 660 therein. The contact file management tool 580 is also configure to adhere to members 120 excluded from certain networks, so that certain members 120 do not have access to other members' 120 contact information.

Detailed Description of Additional Embodiments of the Present Invention

The elements below may also be present in various embodiments of the present invention:

In the embodiments above, members also have access to a financial management tool which is integrated with the social networking functionalities, document management functionalities and integrative functionalities described above. A further integrative functionality allows members of a network to use the financial management tool to remotely and collectively manage time-keeping/invoicing records and data and accounting/check-writing records and data. The financial management tool comprises software applications allowing members to remotely and collectively manage time-keeping/invoicing records and data and accounting/check-writing records and data. One of the software applications is a time-keeping/invoicing tool such as Prolaw® Transactions or AbacusLaw®, and includes all of the features of Prolaw® Transactions or AbacusLaw®, which time-keeping/invoicing tools and features are fully described in the prior art, such disclosures incorporated herein by reference. One of the software applications is an accounting/check-writing tool such as Prolaw® Journals or AbacusLaw®, and includes all of the features of Prolaw® Journals or AbacusLaw®, which accounting/check-writing tools and features are fully described and enabled in the prior art, such disclosures incorporated herein by reference. The member owning the profile depicted at FIG. 6 described above may access the financial management tool by clicking on a "Time-Keeping/Invoicing" icon on his/her home page like the "Emails" icon on the home page depicted at FIG. 5, or clicking on an "Accounting/Check-Writing" icon on his/her home page like the "Word Processing" icon on the home page depicted at FIG. 5.

A method for interactively collaborating within a secure, server-based social networking community, comprising integrating a plurality of social networking functionality modules accessible to members of the community, the plurality of social networking functionality modules permitting the members to perform one or more tasks within the community; assembling the members into one or more networks of members, wherein at least one of the plurality of social networking functionality modules allows each member to participate in said one or more networks, and wherein the one or more networks are configured to exclude one or more members of the community; sharing one or more documents in a remote secure environment within the community, wherein excluded one or more members do not have access to the one or more documents; accessing software applications to remotely create, delete, edit and manage the one or more documents and view information about the one or more documents in a plurality of customizable and selectable viewing options; and communicating via a plurality of communications sub-modules each accessible via at least one interface in the community.

The method above, further comprising adding and deleting members from the one or more networks of members, wherein the adding or deleting is performed by a network administrator.

The method above, wherein the plurality of communications sub-modules at least include voice conferencing, video conferencing, emailing, messaging, instant messaging, calendaring, and a foreign language translation tool.

The method above, further comprising accessing the plurality of communications sub-modules via a single click of an icon on a member virtual identity, each member having a member virtual identity.

The method above, further comprising automatically translating communications from at least one of the members made via a communications sub-module in the plurality of communications sub-modules.

The method above, wherein the automatically translating communications translates text written in a foreign language to another foreign language.

The method above, wherein said automatically translating occurs in near real time.

The method above, wherein the communications include at least one term-of-art, each term-of-art in the at least one term-of-art identified as a term-of-art by a context in which the term-of-art exists.

The method above, wherein the accessing software applications to remotely create, delete, edit and manage the one or more documents and view information about the one or more documents includes software applications selected from the group consisting of an email tool, word processor tool, a spreadsheet tool, a presentation tool, an image viewing tool, a document management tool, and a calendaring tool.

The method above, wherein the document management tool allows a member to manage a plurality of rooms of documents existing within the one more networks of members, such that at least one room of documents is shared within at least one of said network of members and is not shared with another one of said network of members.

The method above, wherein the member manages a room of documents such that at least one document in the one or more documents is shared within a network of members in the one or more network of members and at least one document in the one or more documents is not shared with the network of members in the one or more network of members.

The method above, wherein the document management tool allows a member to simultaneously view a plurality of windows, at least one of said plurality of windows having folders for storing the one or more documents, at least another one of the windows having the one or more documents stored in one of the folders, and at least a third one of the windows having the content of at least one of the documents.

The method above, wherein the document management tool incorporates an alternative image viewing tool allowing a member to alternate between a plurality of views of the one or more documents.

The method above, wherein the plurality of views of the one or more documents are selected from a group consisting of a view comprising at least one window showing folders for storing the one or more documents, a window showing the one or more documents stored in one of the folders, and a window showing the content of one of the one or more documents; a view comprising a window showing folders for storing the one or more documents and a window showing the content of one of the one or more documents; a view comprising a window showing the one ore more documents stored in one of the folders and a window showing the content of one of the one or more documents; a view comprising a window showing folders for storing the one or more documents and a window showing the one or more documents stored in one of the folders; and a view comprising a window showing the content of one of the one or more documents.

The method above, wherein the alternative image viewing tool allows a member to alternate between a first set of the plurality of views of the one or more documents and a second set of the plurality of views of the one or more documents by clicking on an icon.

The method above, wherein the icon is an image.

The method above, wherein the icon is a textual link.

The method above, wherein the document management tool allows a member to click and drag a document in the one or more documents stored in a first folder to a second folder such that the document is stored only in the second folder.

The method above, wherein the document management tool allows a member to click and drag a document in the one or more documents stored in a first folder to a second folder such that the document is stored in both the first folder and the second folder.

The method above, wherein the document management tool allows a member to click and drag an open document stored in a first folder to a second folder such that the open document is stored in the second folder and not the first folder.

The method above, wherein the document management tool allows a member to click and drag an open document stored in a first folder to a second folder such that the open document is stored in both the first folder and the second folder.

The method above, wherein members are added or deleted from the one or more networks of members by clicking on an icon of a member virtual identity of a member.

The method above, wherein the icon is an image.

The method above, wherein the icon is a textual link

The method above, further comprising communicating between the members and the network administrator, wherein a member communicates a request for addition of the member to the one or more networks of members by clicking on an icon on a network virtual identity of the one or more networks of members.

The method above, wherein the icon is an image.

The method above, wherein the icon is a textual link

The method above, further comprising confirming, by the network administrator, the identity of a member via a password prompt communicated by the network administrator to the member and a password response communicated to the member to the network administrator.

The method above, further comprising confirming an identity of a network of members, wherein a member confirms the identity of the network of members via a password prompt communicated by the member to the network administrator and a password response communicated by the network administrator to the member.

The method above, wherein a member and the network administrator each confirm an identity of the other via a first password communicated by the first one of the member and the network administrator to the second one of the member and the network administrator, and a second password communicated by the second one of the member and the network administrator to the first one of the member and the network administrator.

The method above, further comprising linking at least one social networking functionality module in the plurality of social networking functionality modules to a set of members, each member in the set of members being a practitioner of a profession, wherein only practitioners of the profession and the set of members linked to the at least one social networking functionality module have access to the at least one social networking functionality module.

The method above, further comprising monitoring professional licenses held by the practitioners via communication with a licensing agency.

The method above, wherein the monitoring professional licenses occurs automatically.

The method above, wherein the profession is law and wherein the license is a law license.

The method above, wherein the document management tool allows a member to simultaneously view a window having folders for storing the one or more documents and a window showing the one or more documents stored in a first one of the folders, wherein the member may click and drag a document from the one or more documents into a second one of the folders such that the document from the one or more documents is shared with members belonging to one of the one or more network of members and is not shared with members not belonging to the one of the one or more network of members.

The method above, wherein the document management tool allows a member to simultaneously view a window having folders for storing the one or more documents and a window showing the contents of one of the one or more documents, wherein the member may click and drag an open document into a folder such that the open documents is shared with members belonging to one of the one or more network of members and is not shared with members not belonging to the one of the one or more network of members.

A method for transforming a social community having a plurality of members into a secure, server-based collaborative business environment, comprising linking a plurality of members together in a common network, the common network being a secure online location where the plurality of members can share information and where the plurality of members have a common professional or business interest;

and integrating at least one social networking functionality module among a plurality of social networking functionality modules with the common network to facilitate secure communications among the plurality of members, wherein communications are initiated by a single click of an icon on a member virtual identity associated with at least one member of the plurality of members.

The method above, wherein the at least one social networking functionality module among a plurality of social networking functionality modules is selected from a group consisting of voice conferencing, video conferencing, emailing, and messaging.

The method above, further comprising automatically translating communications from at least one member of the plurality of members made via at least one social networking functionality module of the plurality of social networking functionality modules.

The method above, wherein the automatically translating communications occurs in near real time.

The method above, wherein the communications include terms-of-art, wherein each term-of-art in the terms-of-art is identified as a term-of-art by the context of the term-of-art.

The method above, further comprising adding and deleting members from the common network, wherein the adding or deleting is performed by a network administrator.

The method above, further comprising accessing a plurality of communications sub-modules via a single click of an icon assigned to a communications sub-module on the member virtual identity.

The method above, wherein the icon is an image.

The method above, wherein the icon is a textual link.

The method above, further comprising accessing software applications to remotely create, delete, edit and manage one or more documents and view information about the one or more documents.

The method above, wherein the accessing software applications includes software applications selected from the group consisting of an email tool, word processor tool, a spreadsheet tool, a presentation tool, an image viewing tool, a document management tool, and a calendaring tool.

The method above, wherein the document management tool allows a member to manage a plurality of rooms of documents existing within the common network, such that at least one room of documents is shared by members within the common network and is not shared with other members of the common network.

The method above, wherein the member manages a room of documents such that at least one document in the one or more documents is shared by members within common network and at least one document in the one or more documents is not shared by members within the common network.

The method above, wherein the document management tool allows a member to simultaneously view a plurality of windows, at least one of said plurality of windows having folders for storing the one or more documents, at least another one of the windows having the one or more documents stored in one of the folders, and at least a third one of the windows having the content of at least one of the documents.

The method above, wherein the document management tool incorporates an alternative image viewing tool allowing a member to alternate between a plurality of views of the one or more documents.

The method above, wherein the plurality of views of the one or more documents are selected from a group consisting of a view comprising at least one window showing folders for storing the one or more documents, a window showing the one or more documents stored in one of the folders, and a window showing the content of one of the one or more documents; a view comprising a window showing folders for storing the one or more documents and a window showing the content of one of the one or more documents; a view comprising a window showing the one ore more documents stored in one of the folders and a window showing the content of one of the one or more documents; a view comprising a window showing folders for storing the one or more documents and a window showing the one or more documents stored in one of the folders; and a view comprising a window showing the content of one of the one or more documents.

The method above, wherein the alternative image viewing tool allows a member to alternate between a first set of the plurality of views of the one or more documents and a second set of the plurality of views of the one or more documents by clicking on an icon.

The method above, wherein the icon is an image.

The method above, wherein the icon is a textual link.

The method above, wherein the document management tool allows a member to click and drag a document in the one or more documents stored in a first folder to a second folder such that the document is stored only in the second folder.

The method above, wherein the document management tool allows a member to click and drag a document in the one or more documents stored in a first folder to a second folder such that the document is stored in both the first folder and the second folder.

The method above, wherein the document management tool allows a member to click and drag an open document stored in a first folder to a second folder such that the open document is stored in the second folder and not the first folder.

The method above, wherein the document management tool allows a member to click and drag an open document stored in a first folder to a second folder such that the open document is stored in both the first folder and the second folder.

The method above, wherein members are added or deleted from the common network by clicking on the icon on the member virtual identity associated with the member.

The method above, wherein the icon is an image.

The method above, wherein the icon is a textual link

The method above, further comprising linking at least one social networking functionality module in the plurality of social networking functionality modules to a set of members, each member in the set of members being a practitioner of a profession, wherein only practitioners of the profession and the set of members linked to the at least one social networking functionality module have access to the at least one social networking functionality module.

The method above, further comprising monitoring professional licenses held by the practitioners via communication with a licensing agency.

The method above, wherein the monitoring professional licenses occurs automatically.

The method above, wherein the profession is law and wherein the license is a law license.

A method for transforming a social community having a plurality of members into a secure, server-based collaborative business environment, comprising linking a plurality of members together in a common network, the common network being a secure online location where the plurality of members can share information and where the plurality of members have a common professional or business interest; and integrating at least one social networking functionality module among a plurality of social networking functionality modules with the common network to facilitate secure communications among members in the plurality of members who communicate in different languages, the communications between the members including translations from one language to at least one additional language, wherein translations are initiated by a single click of an icon on a member virtual identity associated with at least one member of the plurality of members.

The method above, wherein the at least one social networking functionality module among a plurality of social networking functionality modules is selected from a group consisting of voice conferencing, video conferencing, emailing, and messaging.

The method above, further comprising automatically translating communications from at least one member of the plurality of members made via at least one social networking functionality module of the plurality of social networking functionality modules.

The method above, wherein the automatically translating communications occurs in near real time.

The method above, wherein the communications include terms-of-art, wherein each term-of-art in the terms-of-art is identified as a term-of-art by the context of the term-of-art.

The method above, further comprising accessing a plurality of communications sub-modules via a single click of an icon assigned to a communications sub-module on the member virtual identity.

The method above, wherein the icon is an image.

The method above, wherein the icon is a textual link.

The method above, further comprising accessing software applications to remotely create, delete, edit and manage one or more documents and view information about the one or more documents.

The method above, wherein the accessing software applications includes software applications selected from the group consisting of an email tool, word processor tool, a spreadsheet tool, a presentation tool, an image viewing tool, a document management tool, and a calendaring tool.

The method above, wherein the document management tool allows a member to manage a plurality of rooms of documents existing within the common network, such that at least one room of documents is shared by members within the common network and is not shared with other members of the common network.

The method above, wherein the member manages a room of documents such that at least one document in the one or more documents is shared by members within common network and at least one document in the one or more documents is not shared by members within the common network.

The method above, wherein the document management tool allows a member to simultaneously view a plurality of windows, at least one of said plurality of windows having folders for storing the one or more documents, at least another one of the windows having the one or more documents stored in one of the folders, and at least a third one of the windows having the content of at least one of the documents.

The method above, wherein the document management tool incorporates an alternative image viewing tool allowing a member to alternate between a plurality of views of the one or more documents.

The method above, further comprising adding and deleting members from the common network, wherein the adding or deleting is performed by a network administrator.

The method above, wherein members are added or deleted from the common network by clicking on the icon on the member virtual identity associated with the member.

The method above, further comprising linking at least one social networking functionality module in the plurality of social networking functionality modules to a set of members, each member in the set of members being a practitioner of a profession, wherein only practitioners of the profession and the set of members linked to the at least one social networking functionality module have access to the at least one social networking functionality module.

The method above, further comprising monitoring professional licenses held by the practitioners via communication with a licensing agency.

The method above, wherein the monitoring professional licenses occurs automatically.

The method above, wherein the profession is law and wherein the license is a law license.

A method for transforming a social community having a plurality of members into a secure, server-based collaborative business environment, comprising linking a plurality of members together in a common network, the common network being a secure online location where the plurality of members can share information and where the plurality of members have a common professional or business interest; and integrating at least one social networking functionality module among a plurality of social networking functionality modules with the common network to facilitate secure communications among members in the plurality of members who are practitioners of a profession, so that only the members in the plurality of members who are also practitioners of the profession may access the one social networking functionality module, wherein communications are initiated by a single click of an icon on a member virtual identity associated with at least one member of the plurality of members.

The method above, wherein the at least one social networking functionality module among a plurality of social networking functionality modules is selected from a group consisting of voice conferencing, video conferencing, emailing, and messaging.

The method above, further comprising automatically translating communications from at least one member of the plurality of members made via at least one social networking functionality module of the plurality of social networking functionality modules.

The method above, wherein the automatically translating communications occurs in near real time.

The method above, wherein the communications include terms-of-art, wherein each term-of-art in the terms-of-art is identified as a term-of-art by the context of the term-of-art.

The method above, further comprising accessing a plurality of communications sub-modules via a single click of icon assigned to a communications sub-module on the member virtual identity.

The method above, wherein the icon is an image.

The method above, wherein the icon is a textual link.

The method above, further comprising accessing software applications to remotely create, delete, edit and manage one or more documents and view information about the one or more documents.

The method above, wherein the accessing software applications includes software applications selected from the group consisting of an email tool, word processor tool, a spreadsheet tool, a presentation tool, an image viewing tool, a document management tool, and a calendaring tool.

The method above, wherein the document management tool allows a member to manage a plurality of rooms of documents existing within the common network, such that at least one room of documents is shared by members within the common network and is not shared with other members of the common network.

The method above, wherein the member manages a room of documents such that at least one document in the one or more documents is shared by members within common network and at least one document in the one or more documents is not shared by members within the common network.

The method above, wherein the document management tool allows a member to simultaneously view a plurality of windows, at least one of said plurality of windows having folders for storing the one or more documents, at least another one of the windows having the one or more documents stored in one of the folders, and at least a third one of the windows having the content of at least one of the documents.

The method above, wherein the document management tool incorporates an alternative image viewing tool allowing a member to alternate between a plurality of views of the one or more documents.

The method above, further comprising adding and deleting members from the common network, wherein the adding or deleting is performed by a network administrator.

The method above, wherein members are added or deleted from the common network by clicking on the icon on the member virtual identity associated with the member.

The method above, further comprising linking at least one social networking functionality module in the plurality of social networking functionality modules to a set of members, each member in the set of members being practitioners of the profession, wherein only practitioners of the profession and the set of members linked to the at least one social networking functionality module have access to the at least one social networking functionality module.

The method above, further comprising monitoring professional licenses held by the practitioners via communication with a licensing agency.

The method above, wherein the monitoring professional licenses occurs automatically.

The method above, wherein the profession is law and wherein the license is a law license.

An apparatus configured to transform a social community having a plurality of members into a secure, server-based collaborative business environment, comprising a network comprising a plurality of members linked together over a secure, server-based, online environment where the plurality of members can share information and where the plurality of members have a common professional or business interest; and a plurality of social networking functionality modules resident on and accessible from one or more remote processors permitting the plurality of members to perform one or more tasks within the community, the plurality of social networking functionality modules including communications modules allowing the plurality of members to conduct secure communications initiated by a single click of an icon on a another member virtual identity associated with at least one member of the plurality of members, a document management module allowing the plurality of members to share one or more documents in a secure location such that only certain of the plurality of members have access to the one or more documents and allowing the plurality of members to remotely create, delete, edit and manage the one or more documents and view information about the one or more documents in a plurality of customizable and selectable viewing options.

The apparatus above, wherein the communications modules include voice conferencing, video conferencing, emailing, and messaging modules.

The apparatus above, wherein the automatically translation of communications occurs in near real time.

The apparatus above, wherein the communications include terms-of-art, wherein each term-of-art in the terms-of-art is identified as a term-of-art by the context of the term-of-art.

The apparatus above, further comprising software applications module allowing members to remotely create, delete, edit and manage one or more documents and view information about the one or more documents.

The apparatus above, wherein the software applications module includes software applications selected from the group consisting of an email tool, word processor tool, a spreadsheet tool, a presentation tool, an image viewing tool, a document management tool, and a calendaring tool.

The apparatus above, wherein the document management tool allows a member to manage a plurality of rooms of documents existing within the common network, such that at least one room of documents is shared by members within the common network and is not shared with other members of the common network.

The apparatus above, wherein the member manages a room of documents such that at least one document in the one or more documents is shared by members within common network and at least one document in the one or more documents is not shared by members within the common network.

The apparatus above, wherein the document management tool allows a member to simultaneously view a plurality of windows, at least one of said plurality of windows having folders for storing the one or more documents, at least another one of the windows having the one or more documents stored in one of the folders, and at least a third one of the windows having the content of at least one of the documents.

The apparatus above, wherein the document management tool incorporates an alternative image viewing tool allowing a member to alternate between a plurality of views of the one or more documents.

The apparatus above, wherein at least one social networking functionality module in the plurality of social networking functionality modules is linked to a set of members, each member in the set of members being practitioners of the profession, wherein only practitioners of the profession and the set of members linked to the at least one social networking functionality module have access to the at least one social networking functionality module.

The apparatus above, wherein professional licenses held by the practitioners are monitored via communication with a licensing agency.

The apparatus above, wherein the monitoring of professional licenses occurs automatically.

The apparatus above, wherein the profession is law and wherein the license is a law license.

A document management system, comprising a member management module configured to manage members of the online community and access to one or more documents in the document management system depending upon access permission of each member, wherein members are granted access permission based on membership in a profession and assignment to a project involving the one or more documents; a document viewing module configured to provide viewing options for the one or more documents, the document viewing module managing a plurality of windows and folders within which the one or more documents can be viewed, created, edited, and deleted; an upload and download module configured to manage an ability of members of the community to upload the one or more documents to the community and download from the community; a native platform module configured to allow members of the community to view and edit the one or more documents in their respective native formats and in their respective native applications; and a security module configured to allow access to the one or more documents in one or more secure rooms; wherein each of the modules are resident on and accessible from one or more remote processors, and accessible by members of the community via a graphical user interface to the community.

The system above, further comprising a plurality of communications modules configured to allow members to communicate while working on the one or more documents, the communications modules including voice conferencing, video conferencing, emailing, and messaging modules.

The system above, further comprising a software applications module configured to allow members to access various software applications, the software applications including an email tool, word processor tool, a spreadsheet tool, a presentation tool, an image viewing tool, a document management tool, and a calendaring tool.

The system above, wherein the viewing module allows a member to manage a plurality of rooms of documents existing within the community, such that at least one room of documents is shared by members within the common network and is not shared with other members of the common network.

The system above, wherein the member manages a room of documents such that at least one document in the one or more documents is shared by members within common network and at least one document in the one or more documents is not shared by members within the common network.

The system above, wherein the viewing module allows a member to simultaneously view a plurality of windows, at least one of said plurality of windows having folders for storing the one or more documents, at least another one of the windows having the one or more documents stored in one of the folders, and at least a third one of the windows having the content of at least one of the documents.

The system above, wherein the viewing module incorporates an alternative image viewing tool allowing a member to alternate between a plurality of views of the one or more documents.

Detailed Description of Hardware Embodiments and Applications of the Present Invention In one embodiment of the instant invention as an organized online community having a commonality of interest, the following practical processing functions are employed: (i) database server processor function; (ii) portal processor function; and (iii) functionality or utility provision processor function. The database server function is operatively linked to at least one mass storage device to comprise a database. The portal processor function is operatively linked to the database server processor function and connected to a computer network. When different processor functions are operatively linked, an operative link may be by a wireless or wired connection, so long as the data transmission rates support the operation of the independent processors in coordination with each other so as to permit allocation of tasks among the processors according to the requirements of the overall system and any specialization of specific processor function.

The portal processor function verifies information of users logging onto the network by requesting information from the database permitting a user to logon. Each functionality processing function is operatively linked to the portal processor function. The functionality or utility provision processor functions are for providing social and professional utilities according to the various embodiments of the invention.

In the embodiment as an organized online community having a commonality of interest, at least one functionality provision processor function provides a communication utility accessible to a user logged onto the network. Preferably a plurality of communications utilities are provided by a plurality of functionality provision processor functions. As with all practical processor functions described herein, the functionality provision processor functions may be obtained by utilization of one or more CPUs, preferably for high load implementations multiple CPUs configured for parallel processing, and more preferably for massively parallel processing, more preferably for massively parallel processing with as little sharing of computational resources as possible most preferably having a nothing shared architecture.

The communications utilities, which actually serve both a social and a business functional purpose according to the various embodiments of the invention are referred to as social functionalities or utilities herein for simplicity, communication being a foundational requirement of social as well as business interaction. The at least one communication utility or functionality, and preferably plurality of communication utilities together comprise a communications platform common to various embodiments of the invention. The communications platform is preferably multimodal, offering several modes of communication, preferably with conferencing capacity allowing more than two participants in any discourse, for example several modes selected from: (i) phone communication, including for example VOIP and Skype®; (ii) video communication or video chat; (iii) email; and (iv) instant messaging or chat. The multi-modal communications platform may be used to contact other member-users or non-users with appropriately configured computers.

Communications between member-users are preferably facilitated, for example by click-based communication wherein a member posting a virtual identity with contact information, and these contact information may comprise a contact icon or have associated a hyperlink whereby clicking on the contact icon or associated hyperlink by an individual having access to the member virtual identity initiates a communication with the member to which the contact information pertains from a member logged onto the campus or from a non-member having an appropriately configured computer.

As will be instantly apprehended by one of skill in the art, a non-member may peruse the site and inspect information but may not access any functionalities, including any communication platform, and in professionally oriented embodiments, to any professional practice platform, for example a law practice platform, for use in practicing the profession. A logged on member-user has access to provided utilities according to the scheme for accessing functionalities provided according to a specific embodiment of the invention. The virtual campus of the instant invention comprises a cyber-facility for member users to access functionalities, thus a non-member may peruse a member's information and contact the individual member, but does not have access to the campus. Only logged on member-users have access to functionalities or utilities when logged onto the virtual campus provided. A plurality of member-users logged onto the campus may thus employ the communications platform to communicate in real time with each other and may thereby engage in a group or collectively organized activity by virtue of being logged onto the campus.

Additional utilities may be provided in various embodiments. Examples of social utilities which may additionally be provided include profile creation utilities, including for example text, and HTML editors, and image editors, contacts list, including for example personalized rolodex-like contacts list, member-user directory, a general language translation utility, including for example Systran® or the translation tool found in Google® Language Tools. Yet other social utilities that may be provided include for example news, including for example links to outside news sources and news content generated by member-users, recreational utilities, including for example games, for example chess, checkers, backgammon, and computer versions of board games such as Monopoly® and Risk®, puzzles, including crossword puzzles and videogames, including, for example, online interactive inter-member video-gaming. Additional social functionality that may be provided includes, general reference library, general library, music library, including for example a library of downloadable music encoded in MP3, web-based storage, web-based backup, for example the web-based backup system provided by Spare Backup®

More particularly, the instant invention relates to computational methods and systems for providing an international community of licensed professionals with a cyber-environment, which is pleasant, peer populated and provides in addition to social functionality a secure environment and a campus. Professional member-users can access various services, and other profession oriented functionalities, some provided collaboratively. The instant invention creates a virtual campus wherein a secure online platform for practicing the profession is available. The online practice platform, by virtue of its campus setting, enables those operating one virtual office to be in touch with other users and cooperatively access resources or utilities of the campus community at large.

In a preferred embodiment the instant invention is directed to methods and corresponding systems for providing a secure online professional and social network having a virtual campus or facility that can be utilized by member users for both professional and social activities. The network offers a plurality of social networking functionalities or utilities in a collegial peer populated environment.

In one embodiment the invention provides a method providing a secure professional social network campus. The method comprises providing users in an online social network with a plurality of social networking functionalities having utility to members of a profession having a license requirement. And only members of the profession having a license may access any professional functionality.

Thus a preferred embodiment has as the profession law and a law license is required to be a member, and further, access to all of the social networking functionalities requires the law license to have an active status. Examples of functionalities or utilities for lawyers include: confidentiality protected video conference, deposition taking, legal research, document review, specialized practice group sub-network, legal development updating, legal translation, consultant locator and automated ethics assistance. Other professional utilities include for example, document databases which may be set up by groups such as litigation or other legal teams, for example antitrust compliance and audit teams, comprising members of one or more firms to assist in the representation of the client, for example by allowing lawyers to search for preexisting documents that may assist or inform the drafting of new pleadings motions points and authorities and the like.

The instant invention in one embodiment is directed to methods and corresponding systems for providing an online cooperative community having a campus. The general method comprising providing to a plurality of users of an online social network having at least one communication utility provided to users logged onto the campus, a mechanism for cooperation in one or more endeavors of the online community. Users logged onto the campus may cooperate in the furtherance of common interests as a community. The plurality of users may be required to purchase an ownership interest to align members into a common self interest thereby enhancing security of the online campus. Other mechanisms aligning members self interest include, for example, a discount or dividend based upon a measurement of an extent of an involvement of an individual user in the endeavors of the community. Users logged onto the campus are provided a communications platform that provides a plurality of communications utilities allowing a user to conference with a plurality of other users in a the option of communication using a choice including video, voice, instant message and email utilities.

In addition to providing for facile and preferably redundant means for communication between members, to permit substantial organized communal activity, a mechanism for participatory cooperation that may be provided is by user election of a governing board for organizing group endeavors. Other mechanisms for promoting substantial member-user participation in the community include other forms of governance by member users of cooperative activities undertaken in the communal self interest. By way of example rather than limitation, one direct democracy approach to governance would be to allow a member-user referendum process wherein a quorum of members could collectively petition for a referendum on an issue, including calling for a new election of a governing board, should one exist. An online convention is another example of an organizing mechanism for allowing member-users substantial input into the nature of the campus environment and community activities, for example, provision of various utilities, as for example social functionalities including those social utilities comprising the communication platform, and professional utilities that may comprise an integrated platform for professional practice. Such an online convention may be advisory or for governance. The provision of a mechanism for community participation allows member-users to be further aligned in a commonality of individual interest which motivates organized communal behavior.

A member may post information containing contact information and designate other users as authorized to utilize specific entries. Different groups of users, each authorized to utilize different included sets from the entire set of contacts of the user posting the information. Preferably communication may be initiated clicking on the contact information or associated hyperlinks an authorized user.

In more preferred embodiments groups having a commonality of self interest by virtue of sharing a common licensed profession are provided, in addition to the communications platform, a secure online facility for practicing their profession in a collegial peer populated setting. As so embodied a method of creating a secure online professional campus community comprises providing, in an online social network having a plurality of professional functionalities pertinent to the profession, to licensed professionals wherein a license is required to access the professional utility. In a yet more preferred embodiment the invention comprises a method for providing a secure international online professional community having a campus. Provided to licensed practitioners of a professional art by way of the campus are a plurality of professional utilities pertinent to practicing the profession, including a professional translation utility pertinent to the professional art. Members of the profession may collaborate in the practice of the profession art by communicating with other members logged onto the campus by employing the professional translation.

One example would have the profession be law and the license a law license and access to all of the social networking functionalities requires the law license in active status. Preferably the law license and active status are monitored, by online communication with the licensing agency which is preferably automated. Professional utilities are selected from the group consisting of confidentiality protected video conference, deposition taking, legal research, document review, specialized practice group sub-network, legal development updating, legal translation, consultant locator and automated ethics assistance. Ultimately, cooperative utilities are contemplated as provided by community for the utilization of individual users. Examples of cooperative utilities include referral network, financial institution, advice hotline and continuing professional education.

The present invention also includes a corresponding system for providing a secure professional social network campus comprises a database, and processing capacity. At least one database server processor function, is operatively linked to at least one mass storage device to comprise a database. Portal processor function is operatively linked to the database server processor function and connected to a computer network. The portal processor function verifies information of users logging onto the network by requesting information from the database permitting a user logon. A plurality of functionality provision processor functions operatively linked to the portal processor function, at least one functionality provision processor function providing at least one functionality provision processor function providing a social networking functionality whereby the functionalities are accessible to a logged on user. The system may further comprise a licensure verification processor function operatively linked to the server processor function to electronically monitor license information pertaining to an individual user from a licensing agency. The portal processing function periodically verifies the data relating to licensure status, and change in licensure status is communicated to the database, and data relating thereto is updated with the changed status. Access by the user to a specific professional utility is controlled accordingly.

The methods and systems of the instant invention seek to provide a mechanism for cooperative interaction between members. The critical attribute of an organized community is the ability, as in a multi-cellular organism, for individual members to communicate. Thus in one embodiment the instant invention comprises methods and systems for providing an online community. The online social network community provides to a plurality of users a communications platform comprising a plurality of communications utilities. A user may post information containing at least one contact information. By clicking on a specific contact information or a hyperlink associated therewith a communication with the user posting the information, or posting user is initiated by a person accessing the information. The individual accessing the posting member's member virtual identity may be another member-user of the organized online community or an individual from the public at large, to the extent that access to the particular member virtual identity is permitted to non-member individuals. One of skill in the art will apprehend that a non-member attempting to initiate click-based communication with member must have compatible software installed in the computer used to access the network. For example a non-member attempting to access a member Skype® icon must be connected through a computer configured to make Skype® calls. Thus it is contemplated that user-members will be better configured to communicate by the streamlined click communication access of the invention, having the communications platform provided to the online community, but some streamlined click connectivity may be obtained by individual non-members from the public at large.

Thus in one embodiment is directed to an online network of licensed professionals that provides social networking functionality pertinent and useful to professionals. Professionals often have common professional interests, needs and values which are amenable to communal cooperation in pursuit thereof. And as more specifically embodied, the disclosure is directed to a computer network based attorney network as described in more detail below. The disclosure contemplates such a professional utility role for this website for lawyers. In its most preferred embodiment, the system will verify members automatically by checking and monitoring their law licenses for multiple purposes. In addition to maintaining attorney profiles, members will have access to various functionalities such as automated practice specific legal updates, CLE programs, discovery tools, drafting tools, legal research tools and databases, and other collaborative functionalities, such as referral loops, that may require pooling of assets, data or other resources. The emphasis is on providing functionality for lawyers and businesspersons involved in legal matters and decisions in a pleasant social cyber-environment populated by peers. Various sub-networks, also termed 'loops,' are contemplated, including, for example, practice area, experience level, geographic, secure client matter adversarial team and other collaborative loops.

Although anyone can view member virtual identities and profile information contained therein, only licensed lawyers can be unrestricted members and have member virtual identities. Only members will have access to all functionalities, with full membership requiring an active law license that entitles the lawyer to practice law in the licensing jurisdiction. Automated computer functionality for checking law licenses for entering members and ongoing monitoring of license and status is contemplated. Various limited memberships are also contemplated based on attorney sponsorship or sponsorship by another verifying source such as a law school certification subject to an ongoing reporting requirement of a law student's status being in good standing. Members having limited status will have member virtual identities and access to functionalities appropriate to their specific limitations, for example inactive bar members will not have access to litigation tools, but will, for example, have access to educational, social and career building functionalities.

Although any electronically verifiable bar membership is contemplated as entitling one to membership, initially United States state bar members will be integrated into the system for practical reasons. But it is ultimately contemplated that the network will be worldwide in correspondence with both the international nature of the practice of law, and economic activity in general. Thus eventually every admittee to practice law in any jurisdiction in the world will be invited to join.

In a preferable embodiment of the invention as comprising a professional network aligned by a common professional self interest, license monitoring would be automated. The function of verification by automated license monitoring is twofold. First the dual social and professional/business objectives of the network require verification of attorney status to allow the network to serve its purpose in allowing attorneys and others who want to interact with other attorneys to do so. License verification will prevent persons from posing as attorneys and the unauthorized practice of law. A second purpose is to ascertain the general moral character of members and help ensure a high standard of conduct because of the professional ethical obligations of bar members. Thus licensed lawyers can be obligated to self-report any actions affecting their license and to actively monitor and report any relevant information on limited members sponsored by the attorney.

Various social and business networking functionalities are envisioned. One example is periodic featured profile(s), preferably with accompanying interview, made accessible to members or member sub-networks or loops. Video link functionality is contemplated as an integrated feature, allowing lawyers to introduce themselves to clients, teach seminars, meet and confer or just have a social chat from remote locations anywhere using the system. Members will be able to have blogs either on the main site or via a specific functionality, post articles and/or links to articles, which positions can be directed to the members at large or specific loops.

Preferred embodiments of both the invention comprising a professional campus community and the instant invention comprising a general campus community having some commonality of self interest and a mechanism for cooperating in furtherance thereof, provide a basic preferably multi-modal communication platform which is preferably redundant. The preferred multi-modal communication platform provides communications utilities including each of a group consisting of for example several modes selected from: (i) phone communication, including for example VOIP and Skype®; (ii) video communication or video chat; (iii) email; and (iv) instant messaging or chat. The multi-modal communications platform may be used to contact other member-users or non-users with appropriately configured computers. Preferably communication modalities are supported for conferencing capacity allowing more than two participants in any discourse, This basic communication platform supplemented by practice oriented professional utilities and added security features provided as pertinent to the specific licensed profession and professional art, all available to a user logged onto a cyber-campus or campus as provided by the invention comprises a versatile professional practice platform that can, for example, facilitate practice of various professions by allowing cooperation between teams working on a project or task that requires around the clock work. Thus a legal team member in India might work on a document, while her colleague in Los Angeles sleeps, and a radiologist in Israel might handle interpreting films and the like at night for a hospital in Chicago, by way of the campus provided by the instant invention.

Simplicity of purpose and a high level of user-friendliness combined with diverse and useful functionalities both social and especially geared to the practice, are contemplated as resulting in a high level of acceptance by, various professional communities, for example the attorney community. Other features that will attract members include, for example, that member-users, for example lawyers, will be able to express themselves in personal ways, for example, linking their member virtual identity to a video or song, or a friends list. A large number of members allows substantial investment in development and especially facilitates collaborative pooling of assets data or other resources to obtain synergistic results not obtainable without the pooling of resources.

Further, because the portal or site by which members access the network will have an intrinsically very high wealth per user, and because of the large membership envisioned, the website will be able to generate substantial revenues. These marketing revenues will permit investment in further development, which will help maintain market position by keeping the site at the forefront of innovation and particularly user friendly functionality in a lawyer positive peer environment. Development may also yield valuable patent and other intellectual property and/or standalone applications. Marketing derived revenues may also be used for asset pooling with members for profitable endeavors such as operating a financial institution for members which, for example, makes loans to fund litigation.

It is to be understood that other embodiments may be utilized and structural and functional changes me be made without departing from the scope of the present invention. The foregoing descriptions of the embodiments of the invention have been presented for the purposes of illustration and description. It is not intended to be exhaustive or to limit the invention to the precise forms disclosed. Accordingly, many modifications and variations are possible in light of the above teachings. For example, a member may communicate to the network administrator a request for an addition of a member to the at least one network of members by clicking on an icon on the network virtual identity of the at least one network. It is therefore intended that the scope of the invention not be limited by this detailed description.

The invention claimed is:

1. A method for interactively collaborating within a secure, server-based community, comprising:
a plurality of members;
at least one network of members that excludes at least one member of the secure, server-based community, whereby members of said network share access to a set of documents in a secured remote environment, such that members not belonging to said network do not have access to said set of documents;
a document management tool for managing documents comprised of a document filing tool and at least one software application chosen from a group consisting of a message application, an email application, word processor application, a spreadsheet application, a presentations application and an images application, whereby the document management tool enables said members of said network to remotely manage documents of said set of documents, wherein:
the document filing tool is comprised of at least one shared folder shared by said members of said network, and at least one alias folder accessible to a first member of said network and not accessible to at least one other member of said network, wherein the alias folder is a subfolder of the at least one shared folder, and wherein a first member moving a document from the at least one shared folder to the alias folder causes the document to appear in the alias folder as viewed by the first member but to remain in the at least one shared folder as viewed by the at least one other member.

2. The method of claim 1, wherein the first member may cause at least one other member of said network to have access to at least one alias folder of the first member.

3. The method of claim 1, wherein a network administrator of said network may cause at least one other member of said network to have access to at least one alias folder of the first member.

4. The method of claim 1, wherein at least one other member of said network may create at least one alias folder, wherein the at least one alias folder of said at least one other member is distinct from the at least one alias folder of the first member.

5. The method of claim 1, wherein at least one other member of said network may create at least one alias folder, wherein the at least one alias folder of said at least one other member is distinct from the at least one alias folder of the first member and wherein the first member does not see the at least one alias folder of the at least one other member, and wherein the at least one other member does not see the at least one alias folder of the first member.

6. The method of claim 1, wherein the at least one alias folder is visually distinct from the at least one shared folder.

7. The method of claim 1, wherein a first member of said network is able to select between a view that includes the first member's own alias folders and a view that includes the alias folders of a second member.

8. The method of claim 1, wherein a first member of said network uses a drop-down menu to select between a view that includes the first member's own alias folders and a view that includes the alias folders of a second member.

9. The method of claim 1, wherein a first member of said network is able to select between a view that includes the first member's own alias folders and a view that includes no alias folders.

10. The method of claim 1, wherein a first member of said network uses a drop-down menu to select between a view that includes the first member's own alias folders and a view that includes no alias folders.

11. A method for interactively collaborating within a secure, server-based social networking community, comprising:
- a plurality of members, each of such members owning at least one member profile;
- at least one network of member profiles that excludes at least one member of the social networking community, whereby members of said network share access to a set of documents in a secured remote environment, such that members not belonging to said network do not have access to said set of documents, and wherein members of said network share a plurality of social network functionalities among themselves;
- a document management tool for managing documents comprised of a document filing tool and at least one software application chosen from a group consisting of a message application, an email application, word processor application, a spreadsheet application, a presentations application and an images application, whereby the document management tool enables said members of said network to remotely manage documents of said set of documents, wherein:
- the document filing tool is comprised of at least one shared folder shared by said members of said network, and at least one alias folder accessible to a first member of said network and not accessible to at least one other member of said network, wherein the at least one alias folder is a subfolder of the at least one shared folder, and wherein a first member moving a document from the at least one shared folder to the at least one alias folder causes the document to appear in the alias folder as viewed by the first member but to remain in the at least one shared folder as viewed by the at least one other member.

12. The method of claim 11, wherein the first member may cause at least one other member of said network to have access to at least one alias folder of the first member.

13. The method of claim 11, wherein a network administrator of said network may cause at least one other member of said network to have access to at least one alias folder of the first member.

14. The method of claim 11, wherein at least one other member of said network may create at least one alias folder, wherein the at least one alias folder of said at least one other member is distinct from the at least one alias folder of the first member.

15. The method of claim 11, wherein at least one other member of said network may create at least one alias folder, wherein the at least one alias folder of said at least one other member is distinct from the at least one alias folder of the first member and wherein the first member does not see the at least one alias folder of the at least one other member, and wherein the at least one other member does not see the at least one alias folder of the first member.

16. The method of claim 11, wherein the at least one alias folder is visually distinct from the at least one shared folder.

17. The method of claim 11, wherein a first member of said network is able to select between a view that includes the first member's own alias folders and a view that includes the alias folders of a second member.

18. The method of claim 11, wherein a first member of said network uses a drop-down menu to select between a view that includes the first member's own alias folders and a view that includes the alias folders of a second member.

19. The method of claim 11, wherein a first member of said network is able to select between a view that includes the first member's own alias folders and a view that includes no alias folders.

20. The method of claim 11, wherein a first member of said network uses a drop-down menu to select between a view that includes the first member's own alias folders and a view that includes no alias folders.

\* \* \* \* \*